US011224014B2

(12) United States Patent
Heidler et al.

(10) Patent No.: US 11,224,014 B2
(45) Date of Patent: Jan. 11, 2022

(54) POWER MANAGEMENT FOR REMOTE ANTENNA UNITS IN DISTRIBUTED ANTENNA SYSTEMS

(71) Applicant: Corning Optical Communications LLC, Charlotte, NC (US)

(72) Inventors: Christian Heidler, Hohenschaeftlarn (DE); Jonathan Richard Hull, Baldwinsville, NY (US); Jessica Joy Kedziora, Shirley, MA (US); Michael Sauer, Corning, NY (US); Wolfgang Gottfried Tobias Schweiker, Weyarn (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 17/090,149

(22) Filed: Nov. 5, 2020

(65) Prior Publication Data

US 2021/0058860 A1 Feb. 25, 2021

Related U.S. Application Data

(63) Continuation of application No. 16/536,271, filed on Aug. 8, 2019, now Pat. No. 10,849,064, which is a (Continued)

(51) Int. Cl.
*H04W 52/02* (2009.01)
*H04B 10/11* (2013.01)
(Continued)

(52) U.S. Cl.
CPC ........ *H04W 52/0206* (2013.01); *H04B 10/11* (2013.01); *H04B 10/25753* (2013.01);
(Continued)

(58) Field of Classification Search
CPC .... H04B 7/04; H04B 10/11; H04B 10/25753; H04B 10/808; H04W 88/085; H04W 52/0206; H04W 52/0261; H04W 84/12
(Continued)

(56) References Cited

U.S. PATENT DOCUMENTS 4,365,865 A 12/1982 Stiles
4,449,246 A 5/1984 Seiler et al.
(Continued)

FOREIGN PATENT DOCUMENTS

AU 06451/92 B2 1/1994
AU 07311/80 B2 3/2001
(Continued)

OTHER PUBLICATIONS

Notice of Allowance for U.S. Appl. No. 13/626,371 dated Nov. 25, 2014, 7 pages.
(Continued)

*Primary Examiner* — Emmanuel Bayard
(74) *Attorney, Agent, or Firm* — C. Keith Montgomery

(57) ABSTRACT

Power management for remote units in a wireless distribution system. Power can be managed for a remote unit configured to power modules and devices that may require more power to operate than power available to the remote unit. For example, the remote unit may be configured to include power-consuming remote unit modules to provide communication services. As another example, the remote unit may be configured to provide power through powered ports in the remote unit to power-consuming devices. Depending on the configuration of the remote unit, the power-consuming remote unit modules and/or power-consuming devices may demand more power than is available at the remote unit. In this instance, the power available at the remote unit can be distributed to the power-consuming
(Continued)

modules and devices based on the priority of services desired to be provided by the remote unit.

19 Claims, 13 Drawing Sheets

Related U.S. Application Data continuation of application No. 16/031,173, filed on Jul. 10, 2018, now Pat. No. 10,425,891, which is a continuation of application No. 15/228,375, filed on Aug. 4, 2016, now Pat. No. 10,045,288, which is a continuation of application No. 14/845,768, filed on Sep. 4, 2015, now Pat. No. 9,419,712, which is a continuation of application No. 13/860,017, filed on Apr. 10, 2013, now Pat. No. 9,252,874, which is a continuation of application No. PCT/US2011/055861, filed on Oct. 12, 2011.

(60) Provisional application No. 61/392,687, filed on Oct. 13, 2010.

(51) Int. Cl.
  H04B 10/2575 (2013.01)
  H04B 10/80 (2013.01)
  *H04B 7/04* (2017.01)
  *H04W 88/08* (2009.01)
  *H04W 84/12* (2009.01)

(52) U.S. Cl.
  CPC ...... *H04B 10/808* (2013.01); *H04W 52/0261* (2013.01); *H04B 7/04* (2013.01); *H04W 84/12* (2013.01); *H04W 88/085* (2013.01); *Y02D 30/70* (2020.08)

(58) Field of Classification Search
  USPC .......................................... 375/142, 219–222
  See application file for complete search history.

(56) References Cited

U.S. PATENT DOCUMENTS

| | | |
|---|---|---|
| 4,586,861 A | 5/1986 | McKewan |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 4,972,505 A | 11/1990 | Isberg |
| 5,039,195 A | 8/1991 | Jenkins et al. |
| 5,042,086 A | 8/1991 | Cole et al. |
| 5,056,109 A | 10/1991 | Gilhousen et al. |
| 5,125,060 A | 6/1992 | Edmundson |
| 5,138,679 A | 8/1992 | Edwards et al. |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,278,989 A | 1/1994 | Burke et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,329,604 A | 7/1994 | Baldwin et al. |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,404,570 A | 4/1995 | Charas et al. |
| 5,420,863 A | 5/1995 | Taketsugu et al. |
| 5,424,864 A | 6/1995 | Emura |
| 5,428,636 A | 6/1995 | Meier |
| 5,432,838 A | 7/1995 | Purchase et al. |
| 5,436,827 A | 7/1995 | Gunn et al. |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,519,830 A | 5/1996 | Opoczynski |
| 5,534,854 A | 7/1996 | Bradbury et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,559,831 A | 9/1996 | Keith |
| 5,574,815 A | 11/1996 | Kneeland |
| 5,598,288 A | 1/1997 | Collar |
| 5,598,314 A | 1/1997 | Hall |
| 5,603,080 A | 2/1997 | Kaellander et al. |
| 5,606,725 A | 2/1997 | Hart |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,316 A | 6/1998 | McGary et al. |
| 5,774,789 A | 6/1998 | Van et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,862,460 A | 1/1999 | Rich |
| 5,867,485 A | 2/1999 | Chambers et al. |
| 5,867,763 A | 2/1999 | Dean et al. |
| 5,880,863 A | 3/1999 | Rideout et al. |
| 5,881,200 A | 3/1999 | Burt |
| 5,883,882 A | 3/1999 | Schwartz |
| 5,889,469 A | 3/1999 | Mykytiuk et al. |

(56) References Cited

U.S. PATENT DOCUMENTS

| | | |
|---|---|---|
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,046,992 A | 4/2000 | Meier et al. |
| 6,060,879 A | 5/2000 | Mussenden |
| 6,067,053 A | 5/2000 | Runyon et al. |
| 6,069,721 A | 5/2000 | Oh et al. |
| 6,078,622 A | 6/2000 | Boytim et al. |
| 6,081,767 A | 6/2000 | Witt et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat et al. |
| 6,124,957 A | 9/2000 | Goel et al. |
| 6,125,048 A | 9/2000 | Loughran et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,163,266 A | 12/2000 | Fasullo et al. |
| 6,188,876 B1 | 2/2001 | Kim |
| 6,192,216 B1 | 2/2001 | Sabat et al. |
| 6,194,968 B1 | 2/2001 | Winslow |
| 6,212,274 B1 | 4/2001 | Ninh |
| 6,212,397 B1 | 4/2001 | Langston et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,268,946 B1 | 7/2001 | Larkin et al. |
| 6,275,990 B1 | 8/2001 | Dapper et al. |
| 6,279,158 B1 | 8/2001 | Geile et al. |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Roberts et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,366,774 B1 | 4/2002 | Ketonen et al. |
| 6,370,203 B1 | 4/2002 | Boesch et al. |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,400,318 B1 | 6/2002 | Kasami et al. |
| 6,400,418 B1 | 6/2002 | Wakabayashi |
| 6,405,018 B1 | 6/2002 | Reudink et al. |
| 6,405,058 B2 | 6/2002 | Bobier |
| 6,405,308 B1 | 6/2002 | Gupta et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,519,449 B1 | 2/2003 | Zhang et al. |
| 6,523,177 B1 | 2/2003 | Brown et al. |
| 6,525,855 B1 | 2/2003 | Westbrook et al. |
| 6,526,264 B2 | 2/2003 | Sugar et al. |
| 6,535,330 B1 | 3/2003 | Lelic et al. |
| 6,535,720 B1 | 3/2003 | Kintis et al. |
| 6,549,772 B1 | 4/2003 | Chavez et al. |
| 6,551,065 B2 | 4/2003 | Lee |
| 6,556,551 B1 | 4/2003 | Schwartz |
| 6,560,441 B1 | 5/2003 | Sabat et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,584,197 B1 | 6/2003 | Boudreaux et al. |
| 6,587,514 B1 | 7/2003 | Wright et al. |
| 6,588,943 B1 | 7/2003 | Howard |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,747 B1 | 10/2003 | Atkins et al. |
| 6,634,811 B1 | 10/2003 | Gertel et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |

(56) References Cited

U.S. PATENT DOCUMENTS

| | | |
|---|---|---|
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,836,660 B1 | 12/2004 | Wala |
| 6,836,673 B1 | 12/2004 | Trott |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,311 B2 | 4/2005 | Walker et al. |
| 6,882,833 B2 | 4/2005 | Nguyen |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,937,878 B2 | 8/2005 | Kim et al. |
| 6,941,112 B2 | 9/2005 | Hasegawa |
| 6,961,312 B2 | 11/2005 | Kubler et al. |
| 6,963,289 B2 | 11/2005 | Aljadeff et al. |
| 6,963,552 B2 | 11/2005 | Sabat et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 6,984,073 B2 | 1/2006 | Cox |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,020,488 B1 | 3/2006 | Bleile et al. |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,648 B2 | 5/2006 | DeVey |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,073,953 B2 | 7/2006 | Roth et al. |
| 7,082,320 B2 | 7/2006 | Kattukaran et al. |
| 7,084,769 B2 | 8/2006 | Bauer et al. |
| 7,092,710 B2 | 8/2006 | Stoter et al. |
| 7,093,985 B2 | 8/2006 | Lord et al. |
| 7,103,119 B2 | 9/2006 | Matsuoka et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 | 9/2006 | O'Sullivan et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,125 B2 | 11/2006 | Larson et al. |
| 7,142,503 B1 | 11/2006 | Grant et al. |
| 7,142,535 B2 | 11/2006 | Kubler et al. |
| 7,142,619 B2 | 11/2006 | Sommer et al. |
| 7,144,255 B2 | 12/2006 | Seymour |
| 7,160,032 B2 | 1/2007 | Nagashima et al. |
| 7,171,244 B2 | 1/2007 | Bauman |
| 7,177,728 B2 | 2/2007 | Gardner |
| 7,181,206 B2 | 2/2007 | Pedersen |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,202,646 B2 | 4/2007 | Vinciarelli |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,647 B1 | 4/2008 | Faria et al. |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,417,443 B2 | 8/2008 | Admon et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,171 B2 | 11/2008 | Palin et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |

(56) References Cited

U.S. PATENT DOCUMENTS

| | | |
|---|---|---|
| 7,486,782 B1 | 2/2009 | Roos |
| 7,493,129 B1 | 2/2009 | Mostafa et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,515,526 B2 | 4/2009 | Elkayam et al. |
| 7,522,552 B2 | 4/2009 | Fein et al. |
| 7,526,303 B2 | 4/2009 | Chary |
| 7,539,509 B2 | 5/2009 | Bauman et al. |
| 7,542,452 B2 | 6/2009 | Penumetsa |
| 7,545,055 B2 | 6/2009 | Barrass |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,565,099 B2 | 7/2009 | Yamada et al. |
| 7,567,579 B2 | 7/2009 | Korcharz et al. |
| 7,580,384 B2 | 8/2009 | Kubler et al. |
| 7,585,119 B2 | 9/2009 | Sasaki |
| 7,586,861 B2 | 9/2009 | Kubler et al. |
| 7,587,559 B2 | 9/2009 | Brittain et al. |
| 7,593,054 B2 | 9/2009 | Toyomura |
| 7,599,420 B2 | 10/2009 | Forenza et al. |
| 7,606,594 B2 | 10/2009 | Jesse et al. |
| 7,610,046 B2 | 10/2009 | Wala |
| 7,619,535 B2 | 11/2009 | Chen et al. |
| 7,627,250 B2 | 12/2009 | George et al. |
| 7,630,690 B2 | 12/2009 | Kaewell et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks et al. |
| 7,650,519 B1 | 1/2010 | Hobbs et al. |
| 7,653,397 B2 | 1/2010 | Pernu et al. |
| 7,668,153 B2 | 2/2010 | Zavadsky |
| 7,668,565 B2 | 2/2010 | Ylaenen et al. |
| 7,684,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,741,839 B2 | 6/2010 | Jarrard |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat et al. |
| 7,761,718 B2 | 7/2010 | Yasuo et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,787,854 B2 | 8/2010 | Conyers et al. |
| 7,805,073 B2 | 9/2010 | Sabat et al. |
| 7,809,012 B2 | 10/2010 | Ruuska et al. |
| 7,812,766 B2 | 10/2010 | Leblanc et al. |
| 7,817,696 B2 | 10/2010 | Hatakeyama |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,852,228 B2 | 12/2010 | Teng et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,899,395 B2 | 3/2011 | Martch et al. |
| 7,904,115 B2 | 3/2011 | Hageman et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,917,177 B2 | 3/2011 | Bauman |
| 7,920,553 B2 | 4/2011 | Kubler et al. |
| 7,920,858 B2 | 4/2011 | Sabat et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart |
| 7,949,364 B2 | 5/2011 | Kasslin et al. |
| 7,957,777 B1 | 6/2011 | Vu et al. |
| 7,962,042 B2 | 6/2011 | Deas |
| 7,962,111 B2 | 6/2011 | Solum |
| 7,962,176 B2 | 6/2011 | Li et al. |
| 7,969,009 B2 | 6/2011 | Chandrasekaran |
| 7,969,911 B2 | 6/2011 | Mahany et al. |
| 7,970,428 B2 | 6/2011 | Lin et al. |
| 7,990,925 B2 | 8/2011 | Tinnakornsrisuphap et al. |
| 7,996,020 B1 | 8/2011 | Chhabra |
| 8,001,397 B2 | 8/2011 | Hansalia |
| 8,005,152 B2 | 8/2011 | Wegener |
| 8,010,116 B2 | 8/2011 | Scheinert |
| 8,018,907 B2 | 9/2011 | Kubler et al. |
| 8,036,157 B2 | 10/2011 | Hanabusa et al. |
| 8,036,308 B2 | 10/2011 | Rofougaran |
| 8,041,222 B2 | 10/2011 | Lee et al. |
| 8,068,937 B2 | 11/2011 | Eaves |
| 8,078,894 B1 | 12/2011 | Ogami |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,155,525 B2 | 4/2012 | Cox |
| 8,174,428 B2 | 5/2012 | Wegener |
| 8,213,401 B2 | 7/2012 | Fischer et al. |
| 8,270,387 B2 | 9/2012 | Cannon et al. |
| 8,270,838 B2 | 9/2012 | Cox |
| 8,270,990 B2 | 9/2012 | Zhao |
| 8,274,929 B2 | 9/2012 | Schmidt et al. |
| 8,279,800 B2 | 10/2012 | Schmidt et al. |
| 8,290,483 B2 | 10/2012 | Sabat et al. |
| 8,306,563 B2 | 11/2012 | Zavadsky et al. |
| 8,328,145 B2 | 12/2012 | Smith |
| 8,346,091 B2 | 1/2013 | Kummetz et al. |
| 8,346,278 B2 | 1/2013 | Wala et al. |
| 8,406,941 B2 | 3/2013 | Smith |
| 8,417,979 B2 | 4/2013 | Maroney |
| 8,422,884 B2 | 4/2013 | Mao |
| 8,428,510 B2 | 4/2013 | Stratford et al. |
| 8,457,562 B2 | 6/2013 | Zavadsky et al. |
| 8,457,563 B2 | 6/2013 | Kim et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,514,092 B2 | 8/2013 | Cao et al. |
| 8,526,970 B2 | 9/2013 | Wala et al. |
| 8,532,242 B2 | 9/2013 | Fischer et al. |
| 8,532,492 B2 | 9/2013 | Palanisamy et al. |
| 8,548,330 B2 | 10/2013 | Berlin et al. |
| 8,548,526 B2 | 10/2013 | Schmidt et al. |
| 8,583,100 B2 | 11/2013 | Koziy et al. |
| 8,588,614 B2 | 11/2013 | Larsen |
| 8,605,394 B2 | 12/2013 | Crookham et al. |
| 8,620,375 B2 | 12/2013 | Kim et al. |
| 8,622,632 B2 | 1/2014 | Isenhour et al. |
| 8,626,245 B2 | 1/2014 | Zavadsky et al. |
| 8,634,766 B2 | 1/2014 | Hobbs et al. |
| 8,649,684 B2 | 2/2014 | Casterline et al. |
| 8,681,917 B2 | 3/2014 | McAllister et al. |
| 8,682,338 B2 | 3/2014 | Lemson et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |

(56) References Cited

U.S. PATENT DOCUMENTS

| | | |
|---|---|---|
| 8,737,454 B2 | 5/2014 | Wala et al. |
| 8,743,718 B2 | 6/2014 | Grenier et al. |
| 8,743,756 B2 | 6/2014 | Uyehara et al. |
| 8,744,390 B2 * | 6/2014 | Stratford ............... H04B 17/12 455/226.1 |
| 8,781,637 B2 | 7/2014 | Eaves |
| 8,792,933 B2 | 7/2014 | Chen |
| 8,830,035 B2 | 9/2014 | Lindley et al. |
| 8,831,428 B2 | 9/2014 | Kobyakov et al. |
| 8,831,593 B2 | 9/2014 | Melester et al. |
| 8,837,659 B2 | 9/2014 | Uyehara et al. |
| 8,837,940 B2 | 9/2014 | Smith et al. |
| 8,855,832 B2 | 10/2014 | Rees |
| 8,908,607 B2 | 12/2014 | Kummetz et al. |
| 8,929,288 B2 | 1/2015 | Stewart et al. |
| 8,930,736 B2 | 1/2015 | James |
| 8,948,816 B2 | 2/2015 | Stewart et al. |
| 8,958,789 B2 | 2/2015 | Bauman et al. |
| 8,971,903 B2 | 3/2015 | Hossain et al. |
| 8,976,067 B2 | 3/2015 | Fischer |
| 8,994,276 B2 | 3/2015 | Recker et al. |
| 9,001,811 B2 | 4/2015 | Wala et al. |
| 9,026,036 B2 | 5/2015 | Saban et al. |
| 9,037,143 B2 | 5/2015 | Berlin et al. |
| 9,042,732 B2 | 5/2015 | Cune et al. |
| 9,160,449 B2 | 10/2015 | Heidler et al. |
| 9,166,690 B2 | 10/2015 | Brower et al. |
| 9,184,795 B2 | 11/2015 | Eaves |
| 9,223,336 B2 | 12/2015 | Petersen et al. |
| 9,240,835 B2 | 1/2016 | Berlin et al. |
| 9,252,874 B2 | 2/2016 | Heidler et al. |
| 9,270,374 B2 | 2/2016 | Cune et al. |
| 9,343,797 B2 | 5/2016 | Shoemaker et al. |
| 9,419,436 B2 | 8/2016 | Eaves et al. |
| 9,419,712 B2 | 8/2016 | Heidler et al. |
| 9,525,488 B2 | 12/2016 | Beamon et al. |
| 9,532,329 B2 | 12/2016 | Sauer |
| 9,673,904 B2 | 6/2017 | Palanisamy et al. |
| 9,699,723 B2 | 7/2017 | Heidler et al. |
| 9,853,689 B2 | 12/2017 | Eaves |
| 10,020,885 B2 | 7/2018 | Mizrahi et al. |
| 10,045,288 B2 | 8/2018 | Heidler et al. |
| 10,104,610 B2 | 10/2018 | Heidler et al. |
| 10,404,099 B1 | 9/2019 | Bonja et al. |
| 10,405,356 B2 | 9/2019 | Hazani et al. |
| 10,420,025 B2 | 9/2019 | Heidler et al. |
| 2001/0000621 A1 | 5/2001 | Mitsuda et al. |
| 2001/0036163 A1 | 11/2001 | Sabat et al. |
| 2001/0036199 A1 | 11/2001 | Terry |
| 2001/0053011 A1 | 12/2001 | Imajo |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0051434 A1 | 5/2002 | Ozluturk et al. |
| 2002/0055371 A1 | 5/2002 | Arnon et al. |
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0097031 A1 | 7/2002 | Cook et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0118413 A1 | 8/2002 | Yamada et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0180554 A1 | 12/2002 | Clark et al. |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |
| 2003/0111909 A1 | 6/2003 | Liu et al. |
| 2003/0141962 A1 | 7/2003 | Barink |
| 2003/0146765 A1 | 8/2003 | Darshan et al. |
| 2003/0147353 A1 | 8/2003 | Clarkson et al. |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0178979 A1 | 9/2003 | Cohen |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037300 A1 | 2/2004 | Lehr et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0057543 A1 | 3/2004 | Huijgen et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0105435 A1 | 6/2004 | Morioka |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0198451 A1 | 10/2004 | Varghese |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0230846 A1 | 11/2004 | Mancey et al. |
| 2004/0233877 A1 | 11/2004 | Lee et al. |
| 2004/0258105 A1 | 12/2004 | Spathas et al. |
| 2005/0047030 A1 | 3/2005 | Lee |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0197094 A1 | 9/2005 | Darshan et al. |
| 2005/0201761 A1 | 9/2005 | Bartur et al. |
| 2005/0219050 A1 | 10/2005 | Martin |
| 2005/0220458 A1 | 10/2005 | Kupershmidt et al. |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0262364 A1 | 11/2005 | Diab et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |

(56) References Cited

U.S. PATENT DOCUMENTS

| | | |
|---|---|---|
| 2006/0014548 A1 | 1/2006 | Bolin et al. |
| 2006/0017633 A1 | 1/2006 | Pronkine |
| 2006/0019604 A1 | 1/2006 | Hasarchi |
| 2006/0045054 A1 | 3/2006 | Utsumi et al. |
| 2006/0053324 A1 | 3/2006 | Giat et al. |
| 2006/0062579 A1 | 3/2006 | Kim et al. |
| 2006/0079290 A1 | 4/2006 | Seto et al. |
| 2006/0084379 A1 | 4/2006 | O'Neill |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0192434 A1 | 8/2006 | Vrla et al. |
| 2006/0233506 A1 | 10/2006 | Noonan et al. |
| 2006/0239630 A1 | 10/2006 | Hase et al. |
| 2006/0267843 A1 | 11/2006 | Sakama et al. |
| 2006/0274704 A1 | 12/2006 | Desai et al. |
| 2007/0004467 A1 | 1/2007 | Chary |
| 2007/0008939 A1 | 1/2007 | Fischer |
| 2007/0009266 A1 | 1/2007 | Bothwell et al. |
| 2007/0053311 A1 | 3/2007 | Kim et al. |
| 2007/0058332 A1 | 3/2007 | Canterbury et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0157251 A1 | 7/2007 | Shrivastava et al. |
| 2007/0166042 A1 | 7/2007 | Seeds et al. |
| 2007/0166050 A1 | 7/2007 | Horio et al. |
| 2007/0208961 A1 | 9/2007 | Ghoshal et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat et al. |
| 2007/0274279 A1 | 11/2007 | Wood et al. |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0044186 A1 | 2/2008 | George et al. |
| 2008/0045271 A1 | 2/2008 | Azuma |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0164890 A1 | 7/2008 | Admon et al. |
| 2008/0166094 A1 | 7/2008 | Bookbinder et al. |
| 2008/0167931 A1 | 7/2008 | Gerstemeier et al. |
| 2008/0168283 A1 | 7/2008 | Penning |
| 2008/0181282 A1 | 7/2008 | Wala et al. |
| 2008/0186143 A1 | 8/2008 | George et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0251071 A1 | 10/2008 | Armitstead et al. |
| 2008/0252307 A1 | 10/2008 | Schindler |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller et al. |
| 2008/0310848 A1 | 12/2008 | Yasuda et al. |
| 2008/0311944 A1 | 12/2008 | Hansen et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0040027 A1 | 2/2009 | Nakao |
| 2009/0041413 A1 | 2/2009 | Hurley |
| 2009/0047023 A1 | 2/2009 | Pescod et al. |
| 2009/0055672 A1 | 2/2009 | Burkland et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0100275 A1 | 4/2009 | Chang et al. |
| 2009/0121548 A1 | 5/2009 | Schindler et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2009/0290632 A1 | 11/2009 | Wegener |
| 2009/0304387 A1 | 12/2009 | Farries et al. |
| 2010/0002626 A1 | 1/2010 | Schmidt et al. |
| 2010/0002661 A1 | 1/2010 | Schmidt et al. |
| 2010/0009394 A1 | 1/2010 | Guo |
| 2010/0027443 A1 | 2/2010 | Logalbo et al. |
| 2010/0054227 A1 | 3/2010 | Hettstedt et al. |
| 2010/0054746 A1 | 3/2010 | Logan |
| 2010/0056184 A1 | 3/2010 | Vakil et al. |
| 2010/0056200 A1 | 3/2010 | Tolonen |
| 2010/0067426 A1 | 3/2010 | Voschina et al. |
| 2010/0067906 A1 | 3/2010 | Adhikari et al. |
| 2010/0080154 A1 | 4/2010 | Noh et al. |
| 2010/0080182 A1 | 4/2010 | Kubler et al. |
| 2010/0083330 A1 | 4/2010 | Bernstein et al. |

(56) References Cited

U.S. PATENT DOCUMENTS

| | | |
|---|---|---|
| 2010/0087227 A1 | 4/2010 | Francos et al. |
| 2010/0091475 A1 | 4/2010 | Toms et al. |
| 2010/0106985 A1 | 4/2010 | Panguluri et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1 | 8/2010 | Franklin |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0240302 A1 | 9/2010 | Buczkiewicz et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamaeki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055861 A1 | 3/2011 | Covell et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0071734 A1 | 3/2011 | Van et al. |
| 2011/0086614 A1 | 4/2011 | Brisebois et al. |
| 2011/0105110 A1 | 5/2011 | Carmon et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0135308 A1 | 6/2011 | Tarlazzi et al. |
| 2011/0141895 A1 | 6/2011 | Zhang |
| 2011/0149879 A1 | 6/2011 | Noriega et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0172841 A1 | 7/2011 | Forbes, Jr. |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241425 A1 | 10/2011 | Hunter et al. |
| 2011/0241881 A1 | 10/2011 | Badinelli |
| 2011/0243201 A1 | 10/2011 | Phillips et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0260939 A1 | 10/2011 | Korva et al. |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0316755 A1 | 12/2011 | Ayatollahi et al. |
| 2012/0009926 A1 | 1/2012 | Hevizi et al. |
| 2012/0033676 A1 | 2/2012 | Mundra et al. |
| 2012/0045211 A1 | 2/2012 | Tan et al. |
| 2012/0063377 A1 | 3/2012 | Oesterling et al. |
| 2012/0099448 A1 | 4/2012 | Matsuo et al. |
| 2012/0106442 A1 | 5/2012 | Xiao |
| 2012/0106657 A1 | 5/2012 | Fischer et al. |
| 2012/0120995 A1 | 5/2012 | Wurth |
| 2012/0122405 A1 | 5/2012 | Gerber et al. |
| 2012/0163829 A1 | 6/2012 | Cox |
| 2012/0177026 A1 | 7/2012 | Uyehara et al. |
| 2012/0196611 A1 | 8/2012 | Venkatraman et al. |
| 2012/0214538 A1 | 8/2012 | Kim et al. |
| 2012/0263152 A1 | 10/2012 | Fischer et al. |
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2012/0314797 A1 | 12/2012 | Kummetz et al. |
| 2012/0317426 A1 | 12/2012 | Hunter et al. |
| 2012/0319916 A1 | 12/2012 | Gears et al. |
| 2013/0012195 A1 | 1/2013 | Sabat et al. |
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0046415 A1 | 2/2013 | Curtis |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0128929 A1 | 5/2013 | Clevorn et al. |
| 2013/0132683 A1 | 5/2013 | Ajanovic et al. |
| 2013/0137411 A1 | 5/2013 | Marin |
| 2013/0150063 A1 | 6/2013 | Berlin et al. |
| 2013/0188959 A1 | 7/2013 | Cune et al. |
| 2013/0210490 A1 | 8/2013 | Stewart et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0249292 A1 | 9/2013 | Blackwell et al. |
| 2013/0260706 A1 | 10/2013 | Singh |
| 2013/0295980 A1 | 11/2013 | Reuven et al. |
| 2013/0330086 A1 | 12/2013 | Berlin et al. |
| 2013/0337750 A1* | 12/2013 | Ko .................... H04W 24/00 455/67.13 |
| 2014/0016583 A1 | 1/2014 | Smith |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0057627 A1 | 2/2014 | Hejazi et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0097846 A1* | 4/2014 | Lemaire ............ G01R 33/3415 324/322 |
| 2014/0140225 A1 | 5/2014 | Wala |
| 2014/0146692 A1 | 5/2014 | Hazani et al. |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0148214 A1 | 5/2014 | Sasson |

(56) References Cited

U.S. PATENT DOCUMENTS

| | | |
|---|---|---|
| 2014/0153919 A1 | 6/2014 | Casterline et al. |
| 2014/0158781 A1 | 6/2014 | Kates |
| 2014/0169246 A1 | 6/2014 | Chui et al. |
| 2014/0219140 A1 | 8/2014 | Uyehara et al. |
| 2014/0233442 A1 | 8/2014 | Atias et al. |
| 2014/0241224 A1 | 8/2014 | Fischer et al. |
| 2014/0243033 A1 | 8/2014 | Wala et al. |
| 2014/0269318 A1 | 9/2014 | Hasarchi et al. |
| 2014/0269859 A1 | 9/2014 | Hanson et al. |
| 2014/0293894 A1 | 10/2014 | Saban et al. |
| 2014/0308043 A1 | 10/2014 | Heidler et al. |
| 2014/0308044 A1 | 10/2014 | Heidler et al. |
| 2014/0314061 A1 | 10/2014 | Trajkovic et al. |
| 2015/0072632 A1 | 3/2015 | Pourkhaatoun et al. |
| 2015/0082066 A1 | 3/2015 | Bose et al. |
| 2015/0098350 A1 | 4/2015 | Mini et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0126251 A1 | 5/2015 | Hunter et al. |
| 2015/0207318 A1 | 7/2015 | Lowe et al. |
| 2015/0215001 A1 | 7/2015 | Eaves |
| 2015/0249513 A1 | 9/2015 | Schwab et al. |
| 2015/0380928 A1 | 12/2015 | Saig et al. |
| 2016/0173291 A1 | 6/2016 | Hazani et al. |
| 2016/0294568 A1 | 10/2016 | Chawgo et al. |
| 2016/0352393 A1 | 12/2016 | Berlin et al. |
| 2017/0054496 A1 | 2/2017 | Hazani |
| 2017/0055207 A1 | 2/2017 | Hagage et al. |
| 2017/0070975 A1 | 3/2017 | Ranson et al. |
| 2017/0214236 A1 | 7/2017 | Eaves |
| 2017/0229886 A1 | 8/2017 | Eaves |
| 2018/0351633 A1 | 12/2018 | Birkmeir et al. |
| 2019/0364498 A1 | 11/2019 | Heidler et al. |
| 2021/0051581 A1* | 2/2021 | Heidler ............... H04B 10/808 |

FOREIGN PATENT DOCUMENTS

| | | |
|---|---|---|
| CA | 2065090 A1 | 10/1992 |
| CA | 2242707 A1 | 1/1999 |
| CN | 1745560 A | 3/2006 |
| CN | 1764123 A | 4/2006 |
| CN | 101030162 A | 9/2007 |
| CN | 101151811 A | 3/2008 |
| CN | 101232179 A | 7/2008 |
| CN | 101299517 A | 11/2008 |
| CN | 101496306 A | 7/2009 |
| CN | 101542928 A | 9/2009 |
| CN | 101803246 A | 8/2010 |
| CN | 101876962 A | 11/2010 |
| CN | 101896962 A | 11/2010 |
| DE | 19705253 A1 | 8/1998 |
| DE | 20104862 U1 | 8/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0714218 A1 | 5/1996 |
| EP | 0766343 A2 | 4/1997 |
| EP | 0851618 A2 | 7/1998 |
| EP | 0687400 B1 | 11/1998 |
| EP | 0924881 A2 | 6/1999 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1347607 A1 | 9/2003 |
| EP | 1357683 A2 | 10/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1570626 A2 | 9/2005 |
| EP | 1693974 A1 | 8/2006 |
| EP | 1742388 A1 | 1/2007 |
| EP | 1774700 A1 | 4/2007 |
| EP | 1954019 A1 | 8/2008 |
| EP | 1968250 A1 | 9/2008 |
| EP | 2110955 A1 | 10/2009 |
| EP | 2253980 A1 | 11/2010 |
| GB | 2275834 A | 9/1994 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 58-055770 A | 4/1983 |
| JP | 08-181661 A | 7/1996 |
| JP | 09-083450 A | 3/1997 |
| JP | 09-162810 A | 6/1997 |
| JP | 09-200840 A | 7/1997 |
| JP | 11-068675 A | 3/1999 |
| JP | 11-088265 A | 3/1999 |
| JP | 2000-152300 A | 5/2000 |
| JP | 2000-341744 A | 12/2000 |
| JP | 2002-264617 A | 9/2002 |
| JP | 2002-353813 A | 12/2002 |
| JP | 2003-148653 A | 5/2003 |
| JP | 2003-172827 A | 6/2003 |
| JP | 2004-172734 A | 6/2004 |
| JP | 2004-245963 A | 9/2004 |
| JP | 2004-247090 A | 9/2004 |
| JP | 2004-264901 A | 9/2004 |
| JP | 2004-265624 A | 9/2004 |
| JP | 2004-317737 A | 11/2004 |
| JP | 2004-349184 A | 12/2004 |
| JP | 2005-018175 A | 1/2005 |
| JP | 2005-087135 A | 4/2005 |
| JP | 2005-134125 A | 5/2005 |
| JP | 2007-228603 A | 9/2007 |
| JP | 2008-172597 A | 7/2008 |
| JP | 5260018 B2 | 8/2013 |
| KR | 10-2004-0053467 A | 6/2004 |
| KR | 10-1031619 B1 | 4/2011 |
| KR | 10-2011-0087949 A | 8/2011 |
| WO | 96/03823 A1 | 2/1996 |
| WO | 97/48197 A2 | 12/1997 |
| WO | 99/35788 A2 | 7/1999 |
| WO | 00/42721 A1 | 7/2000 |
| WO | 00/72475 A1 | 11/2000 |
| WO | 01/78434 A1 | 10/2001 |
| WO | 01/84760 A1 | 11/2001 |
| WO | 02/21183 A1 | 3/2002 |
| WO | 02/30141 A1 | 4/2002 |
| WO | 2002/102102 A1 | 12/2002 |
| WO | 03/24027 A1 | 3/2003 |
| WO | 2004/030154 A2 | 4/2004 |
| WO | 2004/047472 A1 | 6/2004 |
| WO | 2004/051322 A2 | 6/2004 |
| WO | 2004/056019 A1 | 7/2004 |
| WO | 2004/059934 A1 | 7/2004 |
| WO | 2004/086795 A2 | 10/2004 |
| WO | 2004/093471 A2 | 10/2004 |
| WO | 2005/062505 A1 | 7/2005 |
| WO | 2005/069203 A2 | 7/2005 |
| WO | 2005/073897 A1 | 8/2005 |
| WO | 2005/079386 A2 | 9/2005 |
| WO | 2005/101701 A2 | 10/2005 |
| WO | 2005/111959 A2 | 11/2005 |
| WO | 2005/117337 A1 | 12/2005 |
| WO | 2006/011778 A1 | 2/2006 |
| WO | 2006/018592 A1 | 2/2006 |
| WO | 2006/019392 A1 | 2/2006 |
| WO | 2006/039941 A1 | 4/2006 |
| WO | 2006/046088 A1 | 5/2006 |
| WO | 2006/051262 A1 | 5/2006 |
| WO | 2006/077569 A1 | 7/2006 |

(56) References Cited

FOREIGN PATENT DOCUMENTS

| WO | 2006/077570 A1 | 7/2006 |
|---|---|---|
| WO | 2006/094441 A1 | 9/2006 |
| WO | 2006/133609 A1 | 12/2006 |
| WO | 2006/136811 A1 | 12/2006 |
| WO | 2007/048427 A1 | 5/2007 |
| WO | 2007/075579 A2 | 7/2007 |
| WO | 2007/077451 A1 | 7/2007 |
| WO | 2007/088561 A1 | 8/2007 |
| WO | 2007/091026 A1 | 8/2007 |
| WO | 2008/008249 A2 | 1/2008 |
| WO | 2008/027213 A2 | 3/2008 |
| WO | 2008/033298 A2 | 3/2008 |
| WO | 2008/039830 A2 | 4/2008 |
| WO | 2008/083317 A1 | 7/2008 |
| WO | 2009/014710 A1 | 1/2009 |
| WO | 2009/100395 A1 | 8/2009 |
| WO | 2009/100396 A1 | 8/2009 |
| WO | 2009/100397 A2 | 8/2009 |
| WO | 2009/100398 A2 | 8/2009 |
| WO | 2009/145789 A1 | 12/2009 |
| WO | 2010/087919 A2 | 8/2010 |
| WO | 2010/089719 A1 | 8/2010 |
| WO | 2010/090999 A1 | 8/2010 |
| WO | 2010/132292 A1 | 11/2010 |
| WO | 2011/043172 A1 | 4/2011 |
| WO | 2011/112373 A1 | 9/2011 |
| WO | 2011/123314 A1 | 10/2011 |
| WO | 2011/139937 A1 | 11/2011 |
| WO | 2011/139939 A1 | 11/2011 |
| WO | 2011/139942 A1 | 11/2011 |
| WO | 2011/160117 A1 | 12/2011 |
| WO | 2012/024345 A2 | 2/2012 |
| WO | 2012/051227 A1 | 4/2012 |
| WO | 2012/051230 A1 | 4/2012 |
| WO | 2012/054553 A1 | 4/2012 |
| WO | 2012/064333 A1 | 5/2012 |
| WO | 2012/071367 A1 | 5/2012 |
| WO | 2012/100468 A1 | 8/2012 |
| WO | 2012/103822 A2 | 8/2012 |
| WO | 2012/115843 A1 | 8/2012 |
| WO | 2012/148940 A1 | 11/2012 |
| WO | 2012/170865 A1 | 12/2012 |
| WO | 2013/009835 A1 | 1/2013 |
| WO | 2014/022211 A1 | 2/2014 |
| WO | 2014/070236 A1 | 5/2014 |
| WO | 2014/082070 A1 | 5/2014 |
| WO | 2014/082072 A1 | 5/2014 |
| WO | 2014/082075 A1 | 5/2014 |
| WO | 2014/144314 A1 | 9/2014 |
| WO | 2015/049671 A2 | 4/2015 |
| WO | 2015/054162 A1 | 4/2015 |
| WO | 2015/054164 A1 | 4/2015 |
| WO | 2015/054165 A1 | 4/2015 |
| WO | 2013/122915 A1 | 8/2018 |

OTHER PUBLICATIONS

Notice of Allowance for U.S. Appl. No. 13/687,457, dated Nov. 20, 2018, 10 pages.
Notice of Allowance for U.S. Appl. No. 13/771,756, dated Jan. 29, 2016, 14 pages.
Notice of Allowance for U.S. Appl. No. 13/899,118, dated Jan. 12, 2017, 7 pages.
Notice of Allowance for U.S. Appl. No. 13/950,397, dated Jun. 10, 2015, 7 pages.
Notice of Allowance for U.S. Appl. No. 14/317,475, dated Aug. 5, 2016, 7 pages.
Notice of Allowance for U.S. Appl. No. 14/845,768, dated Apr. 11, 2016, 8 pages.
Notice of Allowance for U.S. Appl. No. 14/845,929, dated May 9, 2017, 7 pages.
Notice of Allowance for U.S. Appl. No. 14/845,946, dated Jun. 8, 2016, 7 pages.
Notice of Allowance for U.S. Appl. No. 15/228,375, dated Apr. 10, 2018, 8 pages.
Notice of Allowance for U.S. Appl. No. 15/585,688, dated Sep. 1, 2017, 8 pages.
Notice of Allowance for U.S. Appl. No. 15/613,913, dated Aug. 1, 2018, 8 pages.
Notice of Allowance for U.S. Appl. No. 16/203,520, dated Jan. 21, 2020, 13 pages.
Opatic, D., "Radio over Fiber Technology for Wireless Access," Ericsson, Oct. 17, 2009, 6 pages.
Parker et al., "Radio-over-fibre technologies arising from the Building the future Optical Network in Europe {BONE) preject," IET Optoelectron., 2010, vol. 4, Issue 6, pp. 247-259.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. J8- Nov. 2, 2001, vol. 4578, 2002, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schuh et al., "Hybrid Fibre Radio Access: A Network Operators Approach and Requirements," Proceedings of the 1oth Microcoll Conference, Mar. 21-24, 1999, Budapest, Hungary, pp. 211-214.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-c-ellular-connectivity-indoors-demands-sophisticated-design.
Seto, I., et al., "Antenna-Selective Transmit Diversity Technique for OFDM-Based WLANs with Dual-Band Printed I\ntennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Singh et al., "Distributed coordination with deaf neighbors: efficient medium access for 60 GHz mesh networks," IEEE INFOCOM 2010 proceedings, 9 pages.
The Second Office Action for Chinese Patent Application No. 201180059270.4, dated Jan. 28, 2016, 42 pages.
The Third Office Action for Chinese Patent Application No. 201180059270.4, dated Aug. 23, 2016, 6 pages.
Translation of the First Office Action for Chinese Patent Application No. 201180052537.7 dated Jun. 25, 2015, 9 pages.
Translation of the First Office Action for Chinese Patent Application No. 201180053270.3 dated May 26, 2015, 17 pages.
Translation of the Fourth Office Action for Chinese Patent Application No. 201180059270.4, dated Jan. 20, 2017, 6 pages.
Translation of the the First Office Action for Chinese Patent Application No. 201180059270.4 dated May 13, 2015, pp. 19 pages.
Wake, D. et al., "Passive Picocell: A New Concept in Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
International Search Report for PCT/US2010/034005 dated Aug. 12, 2010, 4 pages.
International Search Report for PCT/US2010/056458 dated Aug. 2, 2011, 4 pages.
International Search Report for PCT/US2011/055861 dated Feb. 7, 2012, 4 pages.
International Search Report for PCT/US2011/061761 dated Jan. 26, 2012, 3 pages.
International Search Report for PCT/US2013/058937 dated Jan. 14, 2014, 4 pages.

(56) References Cited

OTHER PUBLICATIONS

International Search Report of the Interantional Searching Authority; PCT/US2011/055858; dated Feb. 7, 2012.
Juntunen, J. et al., "Antenna Diversity Array Design for Mobile Communication Systems," Proceedings of the 2000 7 EEE International Conference on Phased Array Systems and Technology, Dana Point, California, May 2000, IEEE, pp. 65-67.
Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.
Lee, D. et al., "Ricocheting Bluetooth," 2nd International Conference on Microwave and Millimeter Wave Technology Proceedings, Beijing, China, Sep. 2000, IEEE, pp. 432-435.
Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.
Margotte, B. et al., "Fibre Optic Distributed Antenna System for Cellular and PCN/PCS Indoor Coverage," Microwave Engineering Europe, Jun. 1998, 6 pages.
Matsunaka et al., "Point-to-multipoint Digital Local Distribution Radio System in the 21 GHz Band," KDD Technical Journal, Mar. 1991, No. 145, p. 43-54.
MDS SDx Packaged Stations, Technical Manual, MDS 05-6312A01, Rev. B, May 2011, XP-002717790, 44 pages.
Mohammed, Maalim, et al., "New Compact Design of Dual Notched Bands UWB Antenna with Slots in Radiating and Feeding Elements," IEEE Student Conference on Research and Development, Dec. 16-17, 2013, Putrajaya, Malaysia, IEEE, pp. 374-379.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.
Non-final Office Action for U.S. Appl. No. 13/410,916 dated Jul. 18, 2012, 13 pages.
Non-final Office Action for U.S. Appl. No. 13/626,371 dated Dec. 13, 2013, 15 pages.
Non-final Office Action for U.S. Appl. No. 13/626,371 dated Jun. 25, 2014, 16 pages.
Non-final Office Action for U.S. Appl. No. 13/687,457 dated Jul. 30, 2015, 12 pages.
Non-final Office Action for U.S. Appl. No. 13/687,457, dated Jun. 27, 2016, 30 pages.
Non-Final Office Action for U.S. Appl. No. 13/771,756 dated Sep. 10, 2014, 26 pages.
Non-final Office Action for U.S. Appl. No. 13/859,985 dated Feb. 27, 2015, 15 pages.
Non-final Office Action for U.S. Appl. No. 13/860,017 dated Feb. 27, 2015, 15 pages.
Non-final Office Action for U.S. Appl. No. 13/899,118, dated Jun. 30, 2016, 11 pages.
Non-final Office Action for U.S. Appl. No. 13/899,118, dated Jan. 6, 2016, 10 pages.
Non-Final Office Action for U.S. Appl. No. 13/950,397, dated Mar. 17, 2015, 6 pages.
Non-final Office Action for U.S. Appl. No. 14/317,475, dated Feb. 3, 2016, 12 pages.
Non-final Office Action for U.S. Appl. No. 14/845,768, dated Nov. 19, 2015, 12 pages.
Non-Final Office Action for U.S. Appl. No. 14/845,929, dated Nov. 7, 2016, 5 pages.
Non-final Office Action for U.S. Appl. No. 14/845,946, dated Dec. 17, 2015, 11 pages.
Non-Final Office Action for U.S. Appl. No. 14/845,946, dated Sep. 9, 2016, 10 pages.
Non-Final Office Action for U.S. Appl. No. 14/853,118, dated Aug. 12, 2016, 7 pages.
Non-Final Office Action for U.S. Appl. No. 14/884,317, dated Aug. 31, 2016, 16 pages.
Non-Final Office Action for U.S. Appl. No. 14/884,317, dated Feb. 13, 2017, 17 pages.
Non-Final Office Action for U.S. Appl. No. 14/961,098, dated Nov. 14, 2016, 10 pages.
Non-Final Office Action for U.S. Appl. No. 15/049,621, dated Feb. 26, 2018, 15 pages.
Non-Final Office Action for U.S. Appl. No. 15/049,621, dated Jun. 22, 2018, 15 pages.
Non-Final Office Action for U.S. Appl. No. 15/156,556, dated Apr. 11, 2017, 13 pages.
Non-Final Office Action for U.S. Appl. No. 15/156,556, dated May 3, 2018, 12 pages.
Non-Final Office Action for U.S. Appl. No. 15/228,375, dated Sep. 21, 2017, 10 pages.
Non-Final Office Action for U.S. Appl. No. 15/613,913, dated Feb. 8, 2018, 21 pages.
Non-Final Office Action for U.S. Appl. No. 15/614,124, dated Jan. 14, 2019, 6 pages.
Non-Final Office Action for U.S. Appl. No. 16/031,173, dated Nov. 29, 2018, 14 pages.
Non-Final Office Action for U.S. Appl. No. 16/203,520, dated Nov. 21, 2019, 16 pages.
Notice of Allowance and Examiner-Initiated Interview Summary for U.S. Appl. No. 14/845,946, dated Apr. 20, 2017, 10 pages.
Notice of Allowance for U.S. Appl. No. 13/410,916 dated Aug. 9, 2012, 9 pages.
Notice of Allowance for U.S. Appl. No. 13/626,371 dated Aug. 3, 2015, 7 pages.
Advisory Action and Applicant-Initiated Interview Summary for U.S. Appl. No. 13/687,457, dated May 13, 2016, 5 pages.
Advisory Action for U.S. Appl. No. 13/687,457, dated May 24, 2017, 7 pages.
Advisory Action for U.S. Appl. No. 13/771,756, dated Aug. 21, 2015, 4 pages.
Advisory Action for U.S. Appl. No. 14/884,317, dated Oct. 10, 2017, 6 pages.
Advisory Action for U.S. Appl. No. 15/049,621, dated Jan. 3, 2019, 3 pages.
Advisory Action for U.S. Appl. No. 15/156,556, dated Oct. 4, 2017, 3 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Author Unknown, "ADC Has 3rd Generation Services Covered at CeBIT 2001," Business Wire, Mar. 20, 2001, 3 pages.
Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.
Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.htm-l, 15 pages.
Author Unknown, "Fiber Optic Distributed Antenna System," Installation and Users Guide, ERAU Version 1.5, May 2002, Andrews Corporation, 53 pages.
Author Unknown, "INT6400/INT1400: HomePlug AV Chip Set," Product Brief, Atheros Powerline Technology, 27003885 Revision 2, Atheros Communications, Inc., 2009, 2 pages.

(56) References Cited

OTHER PUBLICATIONS

Author Unknown, "MegaPlug AV: 200 Mbps Ethernet Adapter," Product Specifications, Actiontec Electronics, Inc., 2010, 2 pages.
Author Unknown, "Quad IEEE 802.3at Power Over Ethernet Controller," Product Brief, LTC4266, Linear Technology Corporation, 2009, 2 pages.
Author Unknown, "Single IEEE 802.3at Power Over Ethernet Controller," Product Brief, LIC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
Author Unknown, RFID Technology Overview, Date Unknown, 11 pages.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.
Chinese Office Action for Application No. 2011800532703, dated Dec. 11, 2015, 7 pages.
Chinese Search Report for Application No. 2011800532703, dated Oct. 28, 2015, 2 pages.
Cho, Bong Youl et al. "The Forward Link Performance of a PCS System with an AGC," 4th CDMA International Conference and Exhibition, "The Realization of IMT-2000," 1999, 10 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Chu, Ta-Shing et al. "Fiber optic microcellular radio", IEEE Transactions on Vehicular Technology, Aug. 1991, pp. 599-606, vol. 40, Issue 3.
Cooper, A.J., "Fibre/Radio for the Provision of Cordless/Mobile Telephony Services in the Access Network," Electronics Letters, 1990, pp. 2054-2056, vol. 26, No. 24.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
European Patent Application No. 11781681.9 Communication under Rule 71 (3) EPC dated Apr. 9, 2014; 6 Pages; European Patent Office.
European Patent Application No. 11781681.9 dated Aug. 14, 2014; 2 Pages; European Patent Office.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Final Office Action for U.S. Appl. No. 14/884,317, dated Jul. 28, 2017, 26 pages.
Final Office Action for U.S. Appl. No. 13/687,457, dated Feb. 10, 2017, 33 pages.
Final Office Action for U.S. Appl. No. 13/687,457, dated Feb. 12, 2016, 22 pages.
Final Office Action for U.S. Appl. No. 13/771,756 dated Apr. 30, 2015, 38 pages.
Final Office Action for U.S. Appl. No. 13/859,985 dated Jul. 22, 2015, 8 pages.
Final Office Action for U.S. Appl. No. 13/860,017 dated Jul. 23, 2015, 8 pages.
Final Office Action for U.S. Appl. No. 14/317,475, dated May 26, 2016, 12 pages.
Final Office Action for U.S. Appl. No. 15/049,621, dated Nov. 2, 2018, 17 pages.
Final Office Action for U.S. Appl. No. 15/156,556, dated Jul. 26, 2017, 16 pages.
Final Office Action for U.S. Appl. No. 15/156,556, dated Sep. 26, 2018, 19 pages.
Fitzmaurice, M. et al., "Distributed Antenna System for Mass Transit Communications," Vehicular Technology Conference, Boston, Massachusetts, Sep. 2000, IEEE, pp. 2011-2018.
Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.
Gibson, B.C., et al., "Evanescent Field Analysis of Air-Silica Microstructure Waveguides," The 14th Annual Meeting of the IEEE Lasersand Electro-Optics Society, 1-7803-7104-4/01, Nov. 12-13, 2001, vol. 2, pp. 709-710.
Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
International Search Report and Written Opinion for International Patent Application No. PCT/IL2016/050306, dated Jun. 8, 2016, 12 pages.
International Search Report and Written Opinion for PCT/IL2014/050766, dated Nov. 11, 2014, 12 pages.
International Search Report and Written Opinion for PCT/IL2014/051012, dated Mar. 5, 2015, 11 pages.
International Search Report and Written Opinion for PCT/IL2015/050656, dated Oct. 8, 2015, 9 pages.
International Search Report for PCT/IL2013/050976, dated Mar. 18, 2014, 3 pages.

\* cited by examiner

POWER MANAGEMENT FOR REMOTE ANTENNA UNITS IN DISTRIBUTED ANTENNA SYSTEMS

PRIORITY CLAIM

This application is a continuation of U.S. application Ser. No. 16/536,271, filed Aug. 8, 2019, which is a continuation of U.S. application Ser. No. 16/031,173, filed Jul. 10, 2018, now U.S. Pat. No. 10,425,891, which is a continuation of U.S. application Ser. No. 15/228,375, filed Aug. 4, 2016, now U.S. Pat. No. 10,045,288, which is a continuation of U.S. application Ser. No. 14/845,768, filed Sep. 4, 2015, now U.S. Pat. No. 9,419,712, which is a continuation of U.S. application Ser. No. 13/860,017, filed Apr. 10, 2013, now U.S. Pat. No. 9,252,874, which is a continuation of Int. App. No. PCT/US11/55861 filed Oct. 12, 2011, which claims priority to U.S. Provisional App. No. 61/392,687, filed Oct. 13, 2010, all of which are incorporated herein by reference.

RELATED APPLICATIONS

The present application is related to U.S. application Ser. No. 17/088,276, filed Nov. 3, 2020, and entitled "Power Management for Remote Antenna Units in Distributed Antenna Systems," which claims priority to U.S. Provisional App. No. 61/392,687, filed Oct. 13, 2010, both of which are incorporated herein by reference in their entireties.

The present application is also related to U.S. application Ser. No. 17/075,136, filed Oct. 20, 2020, and entitled "Power Management for Remote Antenna Units in Distributed Antenna Systems," which claims priority to U.S. Provisional App. No. 61/392,687, filed Oct. 13, 2010, both of which are incorporated herein by reference in their entireties.

The present application is also related to U.S. application Ser. No. 14/063,245, filed Oct. 25, 2014, and entitled "Systems, Methods, And Devices For Increasing Radio Frequency (RF) Power In Distributed Antenna Systems," which claims priority to U.S. Provisional Application No. 61/480,684, filed Apr. 29, 2011, both of which are incorporated herein by reference in their entireties.

The present application is also related to U.S. application Ser. No. 13/859,985, filed Apr. 10, 2013 and entitled "Local Power Management for Remote Antenna Units in Distributed Antenna Systems," which claims priority to U.S. Provisional Application No. 61/392,660, filed Oct. 13, 2010, both of which are incorporated herein by reference in their entireties.

The present application is also related to U.S. Provisional Application No. 61/330,386, filed May 2, 2010, and entitled "Providing Digital Data Services in Optical Fiber-Based Distributed Radio Frequency (RF) Communications Systems, and Related Components and Methods," which is incorporated herein by reference in its entirety.

The present application is also related to U.S. patent application Ser. No. 12/892,424 filed Sep. 28, 2010, and entitled "Providing Digital Data Services in Optical Fiber-Based Distributed Radio Frequency (RF) Communications Systems, and Related Components and Methods," which is incorporated herein by reference in its entirety.

The present application is also related to U.S. Provisional Application No. 61/230,463, filed Jul. 31, 2009, and entitled "Optical Fiber-Based Distributed Antenna Systems, Components, and Related Methods for Calibration Thereof," which is incorporated herein by reference in its entirety.

The present application is also related to U.S. Provisional Application No. 61/230,472, filed Jul. 31, 2009, and entitled "Optical Fiber-Based Distributed Antenna Systems, Components, and Related Methods for Monitoring the Status Thereof," which is incorporated herein by reference in its entirety.

BACKGROUND

Field of the Disclosure

The technology of the disclosure relates to power management in remote antenna units in distributed antenna systems for distributing radio frequency (RF) signals to the remote antenna units.

Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." The antenna coverage areas are provided by remote antenna units in the distributed antenna system. Remote antenna units can provide antenna coverage areas having radii in the range from a few meters up to twenty (20) meters as an example. If the antenna coverage areas provided each cover a small area, there are typically only a few users (clients) per antenna coverage area. This allows for minimizing the amount of RF bandwidth shared among the wireless system users. It may be desirable to provide antenna coverage areas in a building or other facility to provide indoor distributed antenna system access to clients within the building or facility. It may also be desirable to employ optical fiber to distribute RF communications signals to provide an optical fiber-based distributed antenna system. Distribution of RF communications signals over optical fiber can include Radio-over-Fiber (RoF) distribution. Benefits of optical fiber include increased bandwidth.

Remote antenna units may contain power-consuming circuits and other components that are involved in processing RF communications signals. For example, remote antenna units provided in an optical-fiber based distributed antenna system may include electrical-to-optical (E/O) converters and optical-to-electrical (O/E) converters that require power to operate. The E/O and O/E converters convert downlink optical RF communications signals to downlink electrical RF communications signals and uplink electrical RF communications signals to uplink optical RF communications signals, respectively. Other power-consuming components may be included in the remote antenna unit. A local power source can be provided at the remote antenna units to supply power to power-consuming components in the remote antenna units. Alternatively, to avoid providing a local power source, a remote power source can be provided that provides power over power lines routed to the remote antenna units. The power lines may be provided in separate cabling or bundled in a hybrid cable with communications lines routed to the remote antenna units.

It is important that a sufficient amount of power be provided to the remote antenna unit to properly power the power-consuming components provided therein. Otherwise, the power-consuming components in the remote antenna unit may not properly operate and may not provide intended services for the distributed antenna system. In the case of multiple power-consuming components provided in a remote antenna unit, power provided to the remote antenna unit is split among the multiple components. In this case, it is also important that the power be managed to sufficiently power each of the power-consuming components.

SUMMARY OF THE DETAILED DESCRIPTION

Embodiments disclosed in the detailed description include power management for a remote units in communications system, and related devices, systems, methods, and computer-readable media. The communication system may distribute radio frequency (RF) communications signals to remote units for communicating to client devices. As a non-limiting example, the communication system may be an optical fiber-based communication system. Power can be managed for a remote unit configured to power modules and devices that may require more power to operate than power available to the remote unit. For example, the remote unit may be configured to include power-consuming remote unit modules to provide communication system-related services. As another example, the remote unit may be configured to provide power to power-consuming devices through powered ports in the remote unit. Depending on the configuration of the remote unit, the power-consuming remote unit modules and/or power-consuming devices may demand more power than is available at the remote unit. In this instance, the power available at the remote unit can be distributed to the power-consuming modules and devices based on the priority of services desired to be provided by the remote unit.

In one embodiment, a power management device for remotely managing power consumed at a remote unit in a communication system is provided. The power management device comprises a remote controller communicatively coupled to at least one remote unit configured to provide power to at least one power-consuming device connected to the at least one powered port. The remote controller is configured to communicate with the at least one remote unit to determine an available power budget for the at least one powered port. The remote controller is also configured to communicate the available power budget for the at least one powered port in the at least one remote unit to the at least one remote unit.

In another embodiment, a method of remotely managing power consumed at a remote unit in a communication system is provided. The method includes communicating with at least one remote unit configured to provide power to at least one power-consuming device connected to the at least one powered port to determine an available power budget for the at least one powered port. The method also includes communicating the available power budget for the at least one powered port in the at least one remote unit to the at least one remote unit.

In another embodiment, a computer-readable medium is provided. The computer-readable medium stores one or more programs, the one or more programs comprising instructions, which when executed by a remote controller in a communication system and remotely located from a remote unit, cause the remote controller to communicate with at least one remote unit provided in a communication system to determine an available power budget for at least one powered port and provided in the at least one remote unit configured to provide power to at least one power-consuming device connected to the at least one powered port. The instructions further cause the remote controller to communicate the available power budget for the at least one powered port in the at least one remote unit to the at least one remote unit.

In another embodiment, a remote unit for a communication system is provided. The remote unit comprises at least one power-consuming remote unit module. As non-limiting examples, the at least one power-consuming remote unit module may be comprised of at least one of an RF communications module configured to provide RF communications services, and a digital data services (DDS) module configured to provide DDS. The remote unit further comprises at least one powered port configured to provide power to at least one power-consuming device connected to the at least one powered port. The remote unit further comprises a controller configured to receive an available power budget for the at least one powered port from a remote controller in a communication system. The remote unit controller is further configured to enable power for the at least one powered port if the available power budget is sufficient to power the at least one power-consuming device connected to the at least one powered port.

In another embodiment, a method of managing power consumed at a remote unit in a communication system is provided. The method comprises receiving an available power budget for at least one powered port configured to provide power to at least one power-consuming device connected to the at least one powered port based on power required by at least one power-consuming remote unit module. As non-limiting examples, the at least one power-consuming remote unit module may be comprised of at least one of an RF communications module configured to provide RF communications services, and a digital data services (DDS) module configured to provide DDS. The method further comprises enabling power for the at least one powered port if an available power budget is sufficient to power the at least one power-consuming device connected to the at least one powered port.

In another embodiment, a computer-readable medium is provided. The computer-readable medium stores one or more programs, the one or more programs comprising instructions, which when executed by a remote unit controller in at least one remote unit provided in a communication system, cause the remote unit controller to receive an available power budget from a remote controller for at least one powered port in a remote unit provided in a communication system, the remote unit configured to provide power to at least one power-consuming device connected to the at least one powered port based on power required by at least one power-consuming remote unit module. The instructions further cause the remote unit controller to enable power for the at least one powered port if an available power budget is sufficient to power the at least one power-consuming device connected to the at least one powered port.

It is to be understood that both the foregoing general description and the following detailed description present embodiments, and are intended to provide an overview or framework for understanding the nature and character of the disclosure.

The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include power management for a remote antenna unit(s) (RAUs) in a distributed antenna system, and related devices, systems, methods, and computer-readable media. The distributed antenna system may distribute radio frequency (RF) communications signals to RAUs for communicating to client devices. As a non-limiting example, the distributed antenna system may be an optical fiber-based distributed antenna system. Power can be managed for an RAU configured to power modules and devices that may require more power to operate than power available to the RAU. For example, the RAU may be configured to include power-consuming RAU modules to provide distributed antenna system related services. As another example, the RAU may be configured to provide power to external power-consuming devices through powered ports in the RAU. Depending on the configuration of the RAU, the power-consuming RAU modules and/or external power-consuming devices may demand more power than is available at the RAU. In this instance, the power available at the RAU can be distributed to the power-consuming modules and devices based on the priority of services desired to be provided by the RAU.

Before discussing power management for RAUs provided in distributed antenna systems and related components and methods starting at FIG. 5, FIGS. 1-4 are provided and first discussed below. FIGS. 1-4 provide examples of distributed antenna systems, including those according to the embodiments described herein.

Figure 1:
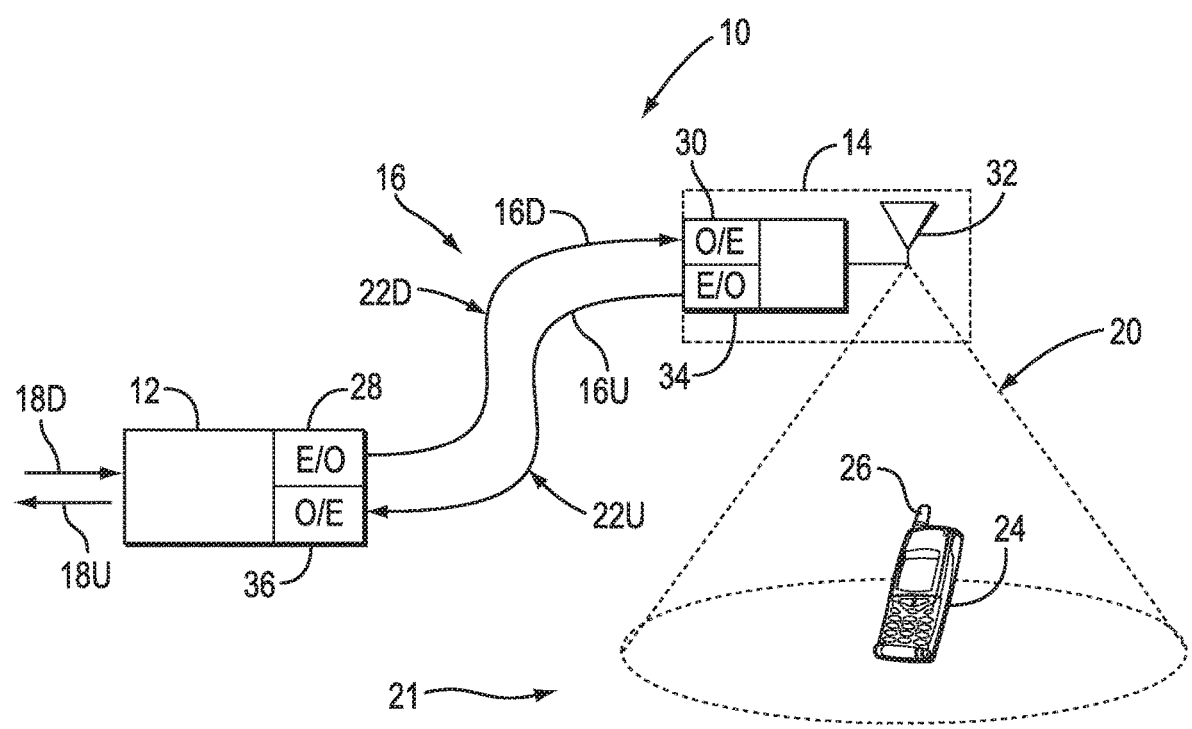
FIG. 1 is a schematic diagram of an exemplary distributed antenna system.

FIG. 1 is a schematic diagram of an exemplary distributed antenna system. In this embodiment, the distributed antenna system is an optical fiber-based distributed antenna system 10; however, other types of distributed antenna systems are also possible. The optical fiber-based distributed antenna system 10 is configured to create one or more antenna coverage areas for establishing communications with wireless client devices located in the RF range of the antenna coverage areas. The optical fiber-based distributed antenna system 10 provides RF communications services (e.g., cellular services). In this embodiment, the optical fiber-based distributed antenna system 10 includes head-end equipment in the form of a head-end unit (HEU) 12, one or more remote antenna units (RAUs) 14, and an optical fiber 16 that optically couples the HEU 12 to the RAU 14. The HEU 12 is configured to receive communications over downlink electrical RF communications signals 18D from a source or sources, such as a network or carrier as examples, and provide such communications to the RAU 14. The HEU 12 is also configured to return communications received from the RAU 14, via uplink electrical RF communications signals 18U, back to the source or sources. In this regard in this embodiment, the optical fiber 16 includes at least one downlink optical fiber 16D to carry signals communicated from the HEU 12 to the RAU 14 and at least one uplink optical fiber 16U to carry signals communicated from the RAU 14 back to the HEU 12.

The optical fiber-based distributed antenna system 10 has an antenna coverage area 20 that can be substantially centered about the RAU 14. The antenna coverage area 20 of the RAU 14 forms an RF coverage area 21. The HEU 12 is adapted to perform or to facilitate any one of a number of Radio-over-Fiber (RoF) applications, such as radio frequency identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF communications signals.

With continuing reference to FIG. 1, to communicate the electrical RF communications signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The RAU 14 includes an optical-to-electrical (O/E) converter 30 to convert received downlink optical RF communications signals 22D back to electrical RF communications signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF communications signals representing the wireless RF communications to an E/O converter 34 in the RAU 14. The E/O converter 34 converts the electrical RF communications signals into uplink optical RF communications signals 22U to be communicated over the uplink optical fiber 16U. An O/E converter 36 provided in the HEU 12 converts the uplink optical RF communications signals 22U into uplink electrical RF communications signals, which can then be communicated as uplink electrical RF communications signals 18U back to a network or other source. The HEU 12 in this embodiment is not able to distinguish the location of the client device 24 in this embodiment. The client device 24 could be in the range of any antenna coverage area 20 formed by an RAU 14.

Figure 2:
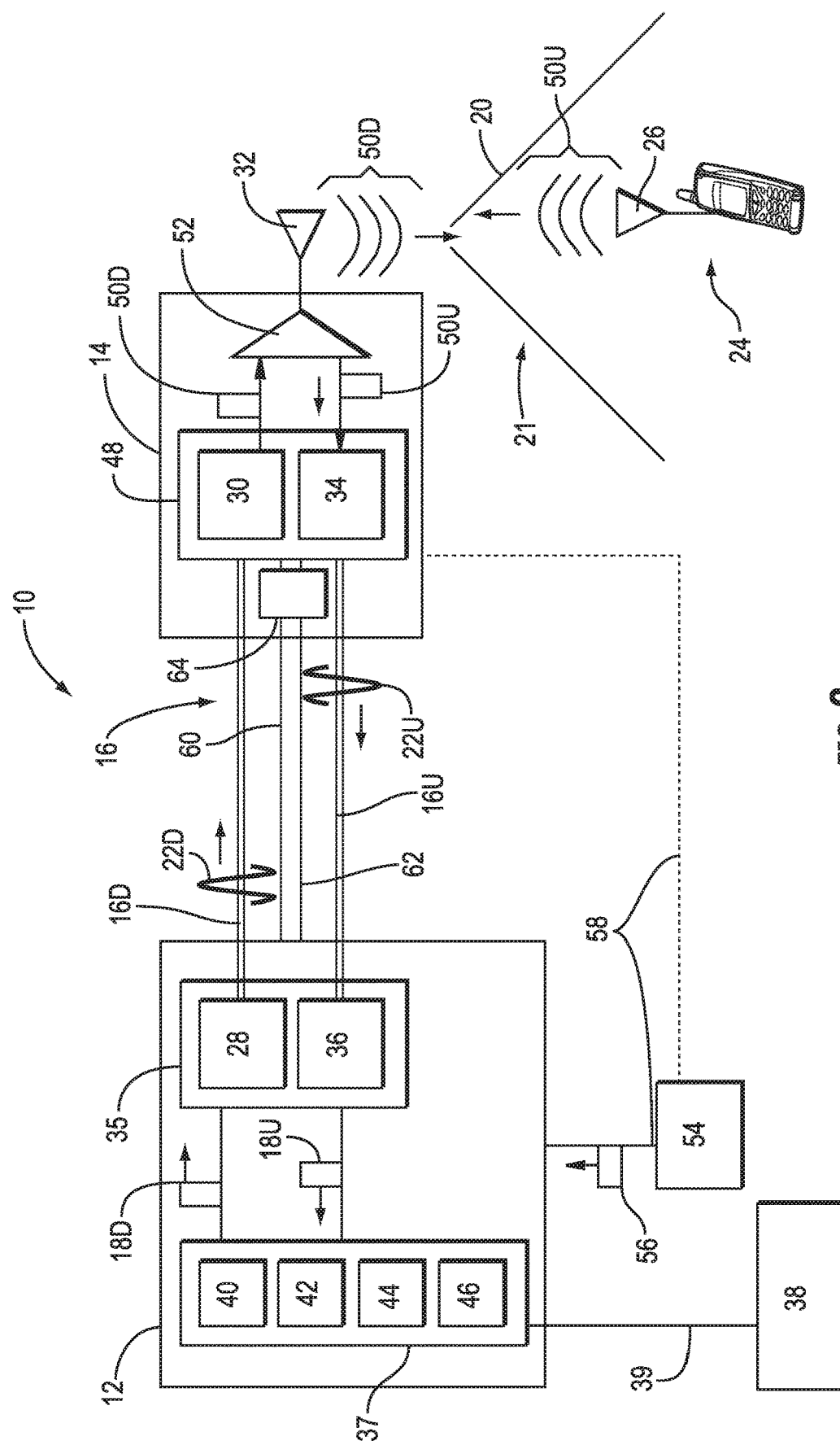
FIG. 2 is a more detailed schematic diagram of exemplary head-end equipment and a remote antenna unit (RAU) that can be deployed in the distributed antenna system of FIG. 1.

FIG. 2 is a more detailed schematic diagram of the exemplary optical fiber-based distributed antenna system 10 of FIG. 1 that provides electrical RF service signals for a particular RF service or application. In an exemplary embodiment, the HEU 12 includes a service unit 37 that provides electrical RF service signals by passing (or conditioning and then passing) such signals from one or more outside networks 38 via a network link 39. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF communications signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF communications signals 18D from the service unit 37 and converts them to corresponding downlink optical RF communications signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEU 12 also includes the O/E converter 36, which is electrically coupled to the service unit 37. The O/E converter 36 receives the uplink optical RF communications signals 22U and converts them to corresponding uplink electrical RF communications signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEU 12 can include an RF communications signal conditioner unit 40 for conditioning the downlink electrical RF communications signals 18D and the uplink electrical RF communications signals 18U, respectively. The service unit 37 can include a digital signal processing unit ("digital signal processor") 42 for providing to the RF communications signal conditioner unit 40 an electrical signal that is modulated onto an RF carrier to generate a desired downlink electrical RF communications signal 18D. The digital signal processor 42 is also configured to process a demodulation signal provided by the demodulation of the uplink electrical RF communications signal 18U by the RF communications signal conditioner unit 40. The service unit 37 in the HEU 12 can also include an optional head-end unit controller (HEC) 44 (or "controller 44") for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF communications signals 22D from the HEU 12 back into downlink electrical RF communications signals 50D. The E/O converter 34 converts uplink electrical RF communications signals 50U received from the client device 24 into the uplink optical RF communications signals 22U to be communicated to the HEU 12. The O/E converter 30 and the E/O converter 34 are electrically coupled to the antenna 32 via an RF signal-directing element 52, such as a circulator for example. The RF signal-directing element 52 serves to direct the downlink electrical RF communications signals 50D and the uplink electrical RF communications signals 50U, as discussed below. In accordance with an exemplary embodiment, the antenna 32 can include any type of antenna, including but not limited to one or more patch antennas, such as disclosed in U.S. patent application Ser. No. 11/504,999, now U.S. Pat. No. 7,627,250, filed Aug. 16, 2006, entitled "Radio-over-Fiber Transponder With A Dual-Band Patch Antenna System," and U.S. patent application Ser. No. 11/451,553, filed Jun. 12, 2006, entitled "Centralized Optical Fiber-based Wireless Picocellular Systems and Methods," both of which are incorporated herein by reference in their entireties.

With continuing reference to FIG. 2, the optical fiber-based distributed antenna system 10 also includes a power supply 54 that provides an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEU 12. In another example embodiment, the electrical power line 58 includes more than two wires and may carry multiple voltages.

Figure 3:
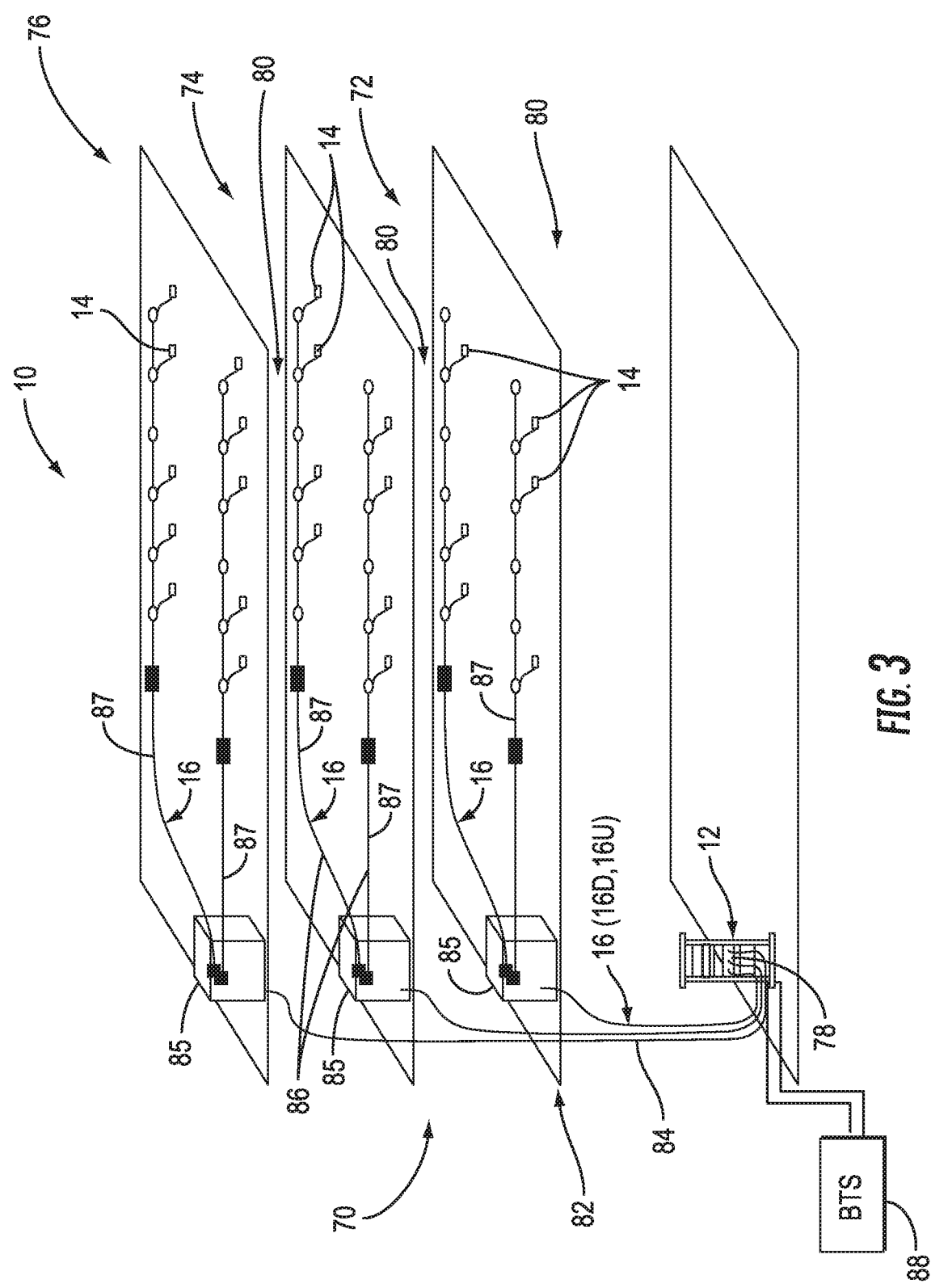
FIG. 3 is a partially schematic cut-away diagram of an exemplary building infrastructure in which the distributed antenna system in FIG. 1 can be employed.

To provide further exemplary illustration of how an optical fiber-based distributed antenna system can be deployed indoors, FIG. 3 is provided. FIG. 3 is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEU 12 to provide various types of communications services to coverage areas within the building infrastructure 70, as an example. For example, as discussed in more detail below, the optical fiber-based distributed antenna system 10 in this embodiment is configured to receive wireless RF communications signals and convert the RF communications signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEU 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables the multiple optical fiber cables 86 to be distributed throughout the building infrastructure 70 (e.g., fixed to the ceilings or other support surfaces of each floor 72, 74, 76) to provide the antenna coverage areas 80 for the first, second, and third floors 72, 74, and 76. In an example embodiment, the HEU 12 is located within the building infrastructure 70 (e.g., in a closet or control room), while in another example embodiment, the HEU 12 may be located outside of the building infrastructure 70 at a remote location. A base transceiver station (BTS) 88, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell, and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater or picocell as other examples.

The optical fiber-based distributed antenna system 10 in FIGS. 1-3 and described above provides point-to-point communications between the HEU 12 and the RAU 14. Each RAU 14 communicates with the HEU 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEU 12. The downlink and uplink optical fibers 16U, 16D may be provided in a fiber optic cable. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16 could be provided to support multiple channels each using wavelength-division multiplexing (WDM), as discussed in U.S. patent application Ser. No. 12/892,424 entitled "Providing Digital Data Services in Optical Fiber-Based Distributed Radio Frequency (RF) Communications Systems, and Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

Figure 4:
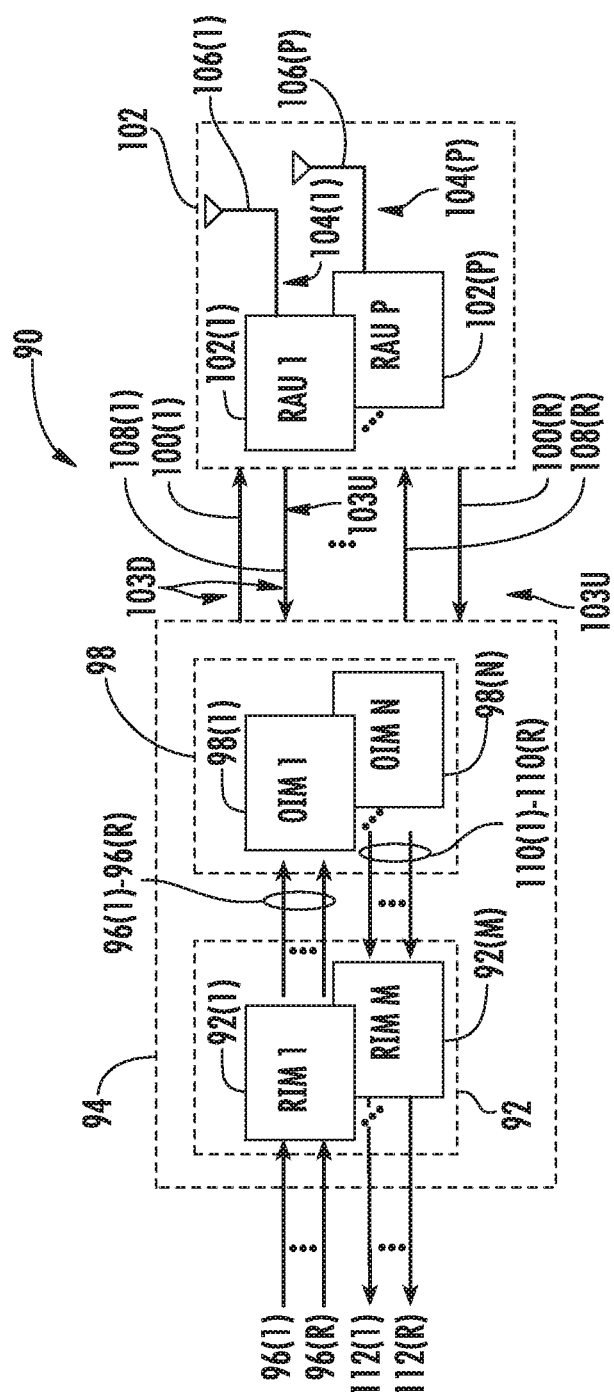
FIG. 4 is a schematic diagram of another exemplary distributed antenna system.

FIG. 4 is a schematic diagram of another exemplary distributed antenna system 90. In this embodiment, the distributed antenna system 90 is an optical fiber-based distributed antenna system comprised of three main components. One or more radio interfaces provided in the form of radio interface modules (RIMs) 92(1)-92(M) in this embodiment are provided in an HEU 94 to receive and process downlink electrical RF communications signals 96(1)-96(R) prior to optical conversion into downlink optical RF communications signals. The processing of the downlink electrical RF communications signals 96(1)-96(R)

can include any of the processing previously described above in the HEU 12 in FIG. 2. The notations "1-R" and "1-M" indicate that any number of the referenced component, 1-R and 1-M, respectively, may be provided. As will be described in more detail below, the HEU 94 is configured to accept a plurality of RIMs 92(1)-92(M) as modular components that can easily be installed and removed or replaced in the HEU 94. In one embodiment, the HEU 94 is configured to support up to four (4) RIMs 92(1)-92(M) as an example.

Each RIM 92(1)-92(M) can be designed to support a particular type of radio source or range of radio sources (i.e., frequencies) to provide flexibility in configuring the HEU 94 and the optical fiber-based distributed antenna system 90 to support the desired radio sources. For example, one RIM 92 may be configured to support the Personal Communication Services (PCS) radio band. Another RIM 92 may be configured to support the 700 MHz radio band. In this example, by inclusion of these RIMs 92, the HEU 94 would be configured to support and distribute RF communications signals on both PCS and LTE 700 radio bands. RIMs 92 may be provided in the HEU 94 that support any frequency bands desired, including but not limited to US Cellular band, PCS (Personal Communication Services) ban, AWS (Advanced Wireless Services) band, 700 MHz band, Global System for Mobile communications (GSM) 900, GSM 1800, UMTS. RIMs 92 may be provided in the HEU 94 that support any wireless technologies desired, including but not limited to CDMA (Code Division Multiple Access), CDMA200, 1×RTT, EV-DO (Evolution—Data Only), UMTS (Universal Mobile Telecommunication System), HSPA (High-speed Packet Access), GSM, GPRS (General Packet Radio Services), EDGE (Enhanced Data GSM Environment), TDMA (Time Division Multiple Access), LTE (Long Term Evolution), iDEN, and CDPD (Cellular Digital Packet Data).

RIMs 92 may be provided in the HEU 94 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink). EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 96(1)-96(R) are provided to a plurality of optical interfaces provided in the form of optical interface modules (OIMs) 98(1)-98(N) in this embodiment to convert the downlink electrical RF communications signals 96(1)-96(N) into downlink optical signals 100(1)-100(R). The notation "1-N" indicates that any number of the referenced component 1-N may be provided. The OIMs 98 may be configured to provide one or more optical interface components (OICs) that contain O/E and E/O converters, as will be described in more detail below. The OIMs 98 support the radio bands that can be provided by the RIMs 92, including the examples previously described above. Thus, in this embodiment, the OIMs 98 may support a radio band range from 400 MHz to 2700 MHz, as an example, so providing different types or models of OIMs 98 for narrower radio bands to support possibilities for different radio band-supported RIMs 92 provided in the HEU 94 is not required. Further, as an example, the OIMs 98$s$ may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 98(1)-98(N) each include E/O converters to convert the downlink electrical RF communications signals 96(1)-96(R) to downlink optical signals 100(1)-100(R). The downlink optical signals 100(1)-100(R) are communicated over downlink optical fiber(s) 103D to a plurality of RAUs 102(1)-102(P). The notation "1-P" indicates that any number of the referenced component 1-P may be provided. O/E converters provided in the RAUs 102(1)-102(P) convert the downlink optical signals 100(1)-100(R) back into downlink electrical RF communications signals 96(1)-96(R), which are provided over links 104(1)-104(P) coupled to antennas 106(1)-106(P) in the RAUs 102(1)-102(P) to client devices in the reception range of the antennas 106(1)-106(P).

E/O converters are also provided in the RAUs 102(1)-102(P) to convert uplink electrical RF communications signals received from client devices through the antennas 106(1)-106(P) into uplink optical signals 108(1)-108(R) to be communicated over uplink optical fibers 103U to the OIMs 98(1)-98(N). The OIMs 98(1)-98(N) include O/E converters that convert the uplink optical signals 108(1)-108(R) into uplink electrical RF communications signals 110(1)-110(R) that are processed by the RIMs 92(1)-102(M) and provided as uplink electrical RF communications signals 112(1)-112(R).

It may be desirable to provide both digital data services and RF communications services for client devices. For example, it may be desirable to provide digital data services and RF communications services in the building infrastructure 70 (FIG. 3) to client devices located therein. Wired and wireless devices may be located in the building infrastructure 70 that are configured to access digital data services. Examples of digital data services include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 5:
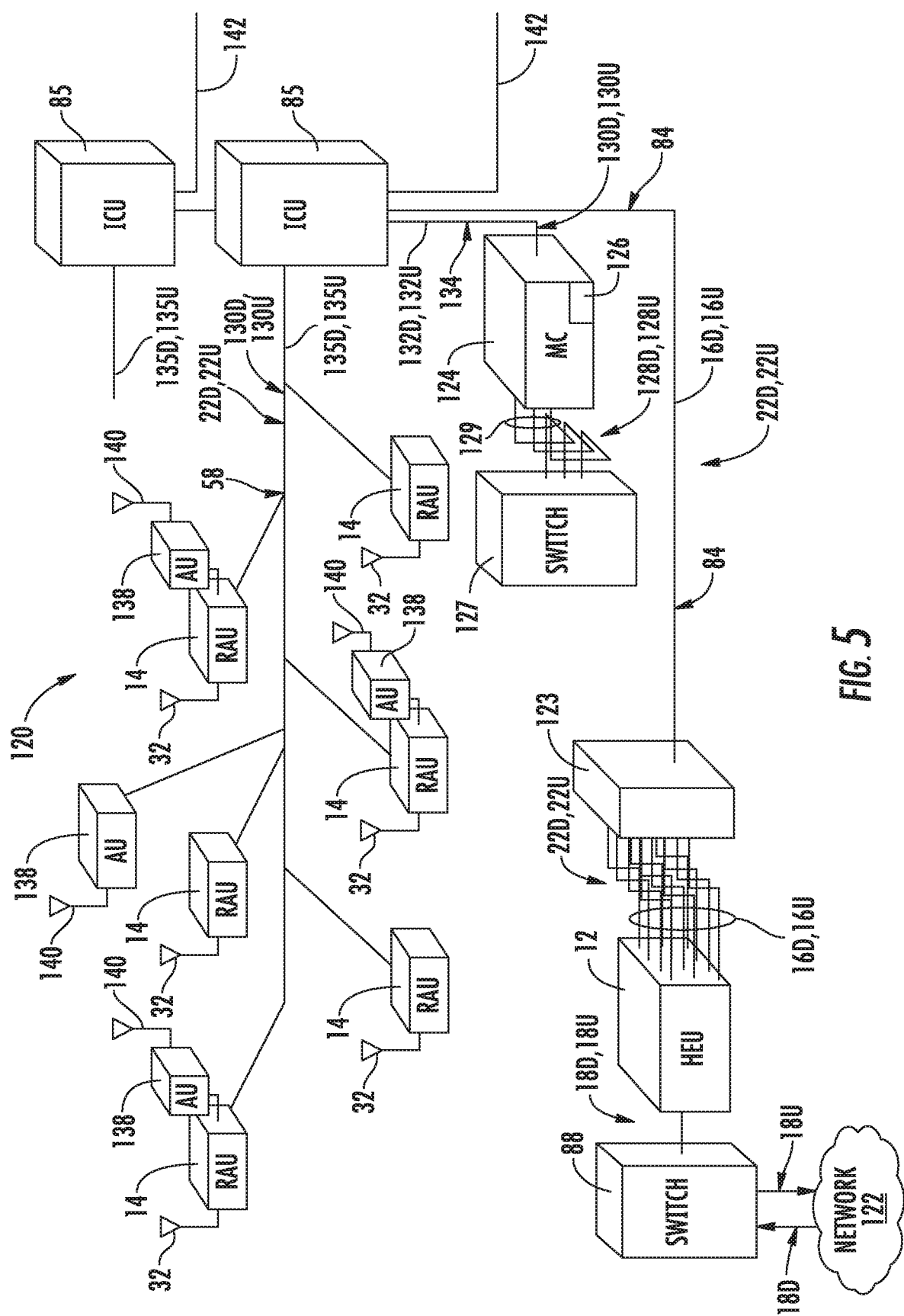
FIG. 5 is a schematic diagram of an exemplary embodiment of providing digital data services to RAUs in a distributed antenna system.

FIG. 5 is a schematic diagram of an exemplary embodiment of providing digital data services over separate downlink and uplink optical fibers from RF communications services to RAUs in an optical fiber-based distributed antenna system 120. The optical fiber-based distributed antenna system 120 is described as including some components provided in the optical fiber-based distributed antenna system 10 of FIGS. 1-3. These common components are illustrated in FIG. 5 with common element numbers with FIGS. 1-3. However, note that the optical fiber-based distributed antenna system 120 could also employ other components, including those in the optical fiber-based distributed antenna system 90 in FIG. 4.

As illustrated in FIG. 5, the HEU 12 is provided. The HEU 12 receives the downlink electrical RF communications signals 18D from the BTS 88. As previously discussed, the HEU 12 converts the downlink electrical RF communications signals 18D to downlink optical RF communications signals 22D to be distributed to the RAUs 14. The HEU 12 is also configured to convert the uplink optical RF communications signals 22U received from the RAUs 14 into uplink electrical RF communications signals 18U to be provided to the BTS 88 and onto a network 122 connected to the BTS 88. A patch panel 123 may be provided to receive the downlink and uplink optical fibers 16D, 16U configured to carry the downlink and uplink optical RF communications signals 22D, 22U. The downlink and uplink optical fibers 16D, 16U may be bundled together in one or more riser cables 84 and provided to one or more ICUs 85, as previously discussed and illustrated in FIG. 3.

To provide digital data services in the optical fiber-based distributed antenna system 120 in this embodiment, a digital data services controller (also referred to as "DDS controller") 124 in the form of a media converter in this example is provided. The DDS controller 124 can include only a media converter for provision media conversion functionality or can include additional functionality to facilitate digital data services. The DDS controller 124 is configured to provide digital data services over a communications link, interface, or other communications channel or line, which may be either wired, wireless, or a combination of both. The DDS controller 124 may include a housing configured to house digital media converters (DMCs) 126 to interface to a DDS switch 127 to support and provide digital data services. For example, the DDS switch 127 could be an Ethernet switch. The DDS switch 127 may be configured to provide Gigabit (Gb) Ethernet digital data service as an example. The DMCs 126 are configured to convert electrical digital signals to optical digital signals, and vice versa. The DMCs 126 may be configured for plug and play installation (i.e., installation and operability without user configuration required) into the DDS controller 124. For example, the DMCs 126 may include Ethernet input connectors or adapters (e.g., RJ-45) and optical fiber output connectors or adapters (e.g., LC, SC, ST, MTP).

With continuing reference to FIG. 5, the DDS controller 124 (via the DMCs 126) in this embodiment is configured to convert downlink electrical digital signals (or downlink electrical digital data services signals) 128D over digital line cables 129 from the DDS switch 127 into downlink optical digital signals (or downlink optical digital data services signals) 130D that can be communicated over downlink optical fiber 135D to RAUs 14. The DDS controller 124 (via the DMCs 126) is also configured to receive uplink optical digital signals 130U from the RAUs 14 via the uplink optical fiber 135U and convert the uplink optical digital signals 130U into uplink electrical digital signals 128U to be communicated to the DDS switch 127. In this manner, the digital data services can be provided over optical fiber as part of the optical fiber-based distributed antenna system 120 to provide digital data services in addition to RF communication services. Client devices located at the RAUs 14 can access these digital data services and/or RF communications services depending on their configuration. Exemplary digital data services include WLAN, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet.

With continuing reference to FIG. 5, in this embodiment, downlink and uplink optical fibers 132D, 132U are provided in a fiber optic cable 134 that is interfaced to the ICU 85. The ICU 85 provides a common point in which the downlink and uplink optical fibers 132D, 132U carrying digital optical signals can be bundled with the downlink and uplink optical fibers 16U, 16D carrying optical RF communications signals. One or more of the fiber optic cables 134, also referenced herein as array cables 134, can be provided containing the downlink and uplink optical fibers 135D, 135U for RF communications services and digital data services to be routed and provided to the RAUs 14. Any combination of services or types of optical fibers can be provided in the array cable 134. For example, the array cable 134 may include single mode and/or multi-mode optical fibers for RF communication services and/or digital data services.

Examples of ICUs that may be provided in the optical fiber-based distributed antenna system 120 to distribute both downlink and uplink optical fibers 135D, 135U for RF communications services and digital data services are described in U.S. patent application Ser. No. 12/466,514, filed on May 15, 2009, entitled "Power Distribution Devices, Systems, and Methods For Radio-Over-Fiber (RoF) Distributed Communication," and U.S. Provisional Application Ser. No. 61/330,385 filed on May 2, 2010, entitled "Power Distribution in Optical Fiber-Based Distributed Communications Systems Providing Digital Data and Radio Frequency (RF) Communications Services, and Related Components and Methods," both of which are incorporated herein by reference in their entireties.

With continuing reference to FIG. 5, some RAUs 14 can be connected to access units (AUs) 138, which may be access points (APs) or other devices supporting digital data services. AUs 138 can also be connected directly to the HEU 12. AUs 138 are illustrated, but the AUs 138 could be any other device supporting digital data services. In the example of AUs, the AUs 138 provide access to the digital data services provided by the DDS switch 127. This is because the downlink and uplink optical fibers 135D, 135U carrying downlink and uplink optical digital signals 130D, 130U converted from downlink and uplink electrical digital signals 128D, 128U from the DDS switch 127 are provided to the AUs 138 via the array cables 134 and RAUs 14. Digital data client devices can access the AUs 138 to access digital data services provided through the DDS switch 127. The AUs 138 may also each include an antenna 140 to provide wireless access to digital data services provided through the DDS switch 127.

As will be described in more detail below, providing RF communications services and digital data services involves providing RF communications modules and DDS modules in the RAUs 14 and/or AUs 138 in the example of FIG. 5. These modules are power-consuming modules that require power to operate. Power distributed to the RAUs can also be used to provide access to power for DDS modules, as opposed to providing separate power sources for DDS modules and RF communications modules. For example, power distributed to the RAUs 14 in FIG. 5 by or through the ICUs 85 can also be used to provide power to the AUs 138 located at the RAUs 14 in the optical fiber-based distributed antenna system 120. In this regard, the ICUs 85 may be configured to provide power for both RAUs 14 and the AUs 138 over an electrical power line 142, as illustrated in FIG. 5. As will also be described in more detail below, the RAUs 14 and/or AUs 138 may also be configured with powered ports to provide power to external client devices connected to the powered ports, such as IEEE 802.3af Power-over-Ethernet (PoE) compatible devices as an example. However, referring to FIG. 5 as an example, the power made available to the RAUs 14 and AUs 138 may not be sufficient to power all of the modules provided and external devices connected to the RAUs 14 and AUs 138.

In this regard, embodiments disclosed below include power management for an RAU(s) in a distributed antenna system, and related devices, systems, methods, and computer-readable media. Power can be managed for an RAU configured to power modules and devices that may require more power to operate than power available to the RAU. For example, the RAU may be configured to include power-consuming RAU modules to provide distributed antenna system-related services. As another example, the RAU may be configured to provide power through powered ports in the RAU to external power-consuming devices. Depending on the configuration of the RAU, the power-consuming RAU modules and/or external power-consuming devices may demand more power than is available at the RAU. In this instance, the power available at the RAU can be distributed to the power-consuming modules and devices based on the priority of services desired to be provided by the RAU.

Figure 6:
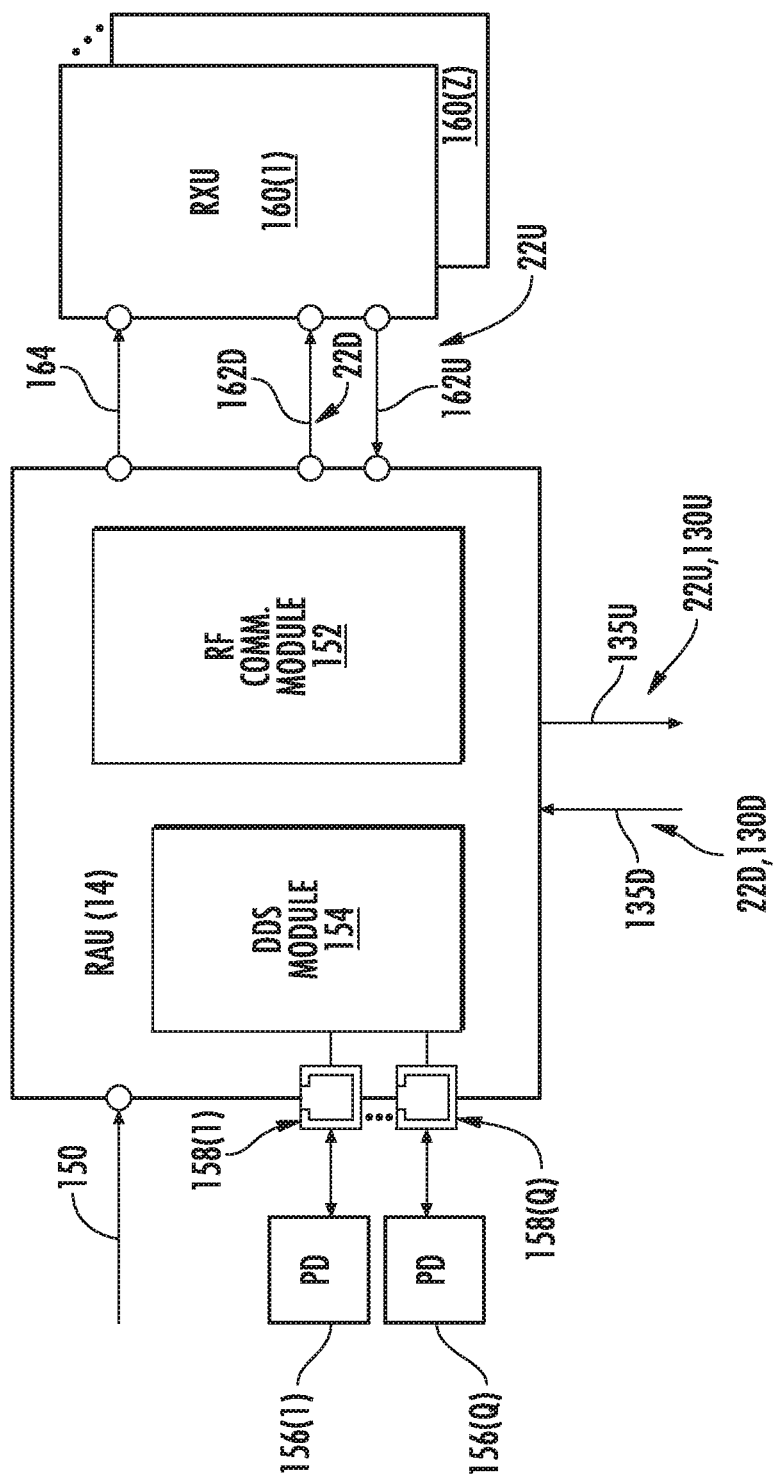
FIG. 6 is a schematic diagram of an exemplary RAU configured with power-consuming components for providing radio frequency (RF) communications services, digital data services, external power to digital data service devices, and a remote expansion unit.

FIG. 6 is a schematic diagram of an exemplary RAU 14 configured with power-consuming components. The RAU 14 is configured to receive power over a power line 150 routed to the RAU 14 from either a local power source or a remote power source to make power available for power-consuming components associated with the RAU 14. As a non-limiting example, the power line 150 may provide a voltage of between forty-eight (48) and sixty (60) Volts at a power rating of between eighty (80) to one hundred (100) Watts. In this example, the RAU 14 includes an RF communications module 152 for providing RF communications services. The RF communications module 152 requires power to operate in this embodiment and receives power from the power line 150. Power may be routed from the power line 150 directly to the RF communications module 152, or indirectly from another module. The RF communications module 152 may include any of the previously referenced components to provide RF communications services, including O/E and E/O conversion.

With continuing reference to FIG. 6, the RAU 14 may also include a DDS module 154 to provide media conversion (e.g., O/E and E/O conversions) and route digital data services received from the DDS switch 127 in FIG. 5 to externally connected power-consuming devices (PDs) 156(1)-156(Q) configured to receive digital data services. Power may be routed from the power line 150 to the DDS module 154 through the RF communications module 152 as one example. is provided to route power from the power line 150 to the DDS module 154. With reference to FIG. 6, the digital data services are routed by the DDS module 154 through communications ports 158(1)-158(Q) provided in the RAU 14. As a non-limiting example, the communications ports 158(1)-158(Q) may be RJ-45 connectors. The communications ports 158(1)-158(Q) may be powered, meaning that a portion of the power from the power line 150 is provided to the powered communications ports 158(1)-158(Q). In this manner, PDs 156(1)-156(Q) configured to receive power through a powered communications port 158 can be powered from power provided to the RAU 14 when connected to the powered communications port 158. In this manner, a separate power source is not required to power the PDs 156(1)-156(Q). For example, the DDS module 154 may be configured to route power to the powered communications ports 158(1)-158(Q) as described in the PoE standard.

With continuing reference to FIG. 6, one or more remote expansion units (RXUs) 160(1)-160(Z) may also be connected to the RAU 14. The RXUs 160(1)-160(Z) can be provided to provide additional RF communications services through the RAU 14, but remotely from the RAU 14. For example, if additional RF communications bands are needed and there are no additional bands available in a distributed antenna system, the RF communications bands of an existing RAU 14 can be expanded without additional communications bands by providing the RXUs 160(1)-160(Z). The RXUs 160(1)-160(Z) are connected to the distributed antenna system through the RAU 14. The RXUs 160(1)-160(Z) can include the same or similar components provided in the RF communications module 152 to receive downlink RF communications signals 162D and to provide received uplink RF communications signals 162U from client devices to the distributed antenna system through the RAU 14. The RXUs 160(1)-160(Z) are also power-consuming modules, and thus in this embodiment, power from the power line 150 is routed by the RAU 14 to the RXUs 160(1)-160(Z) over a power line 164.

The power provided on the power line 150 in FIG. 6 may not be sufficient to provide power for the modules 152, 154, 160(1)-160(Z) and external PDs 156(1)-156(Q) provided in the RAU 14. For example, eighty (80) Watts of power may be provided on the power line 150 in FIG. 6. However, the RF communications module 152 may consume thirty (30) Watts of power, the RXUs 160(1)-160(Z) may consume twenty (20) Watts of power, and the DDS module 154 may consume five (5) Watts of power. This is a total of fifty-five (55) Watts. In this example, twenty-five (25) Watts are available to be shared among the powered communications ports 158(1)-158(Q). However, the PDs 156(1)-156(Q) may be configured to require more power than twenty-five (25) Watts. For example, if the PDs 156(1)-156(Q) are configured according to the PoE standard, power source equipment (PSE) provided in the RAU 14 to provide power to the powered communications ports 158(1)-158(Q) may be required to provide up to 15.4 Watts of power to each powered communications port 158(1)-158(Q). In this example, if more than one powered communications port 158(1)-158(Q) is provided, there will not be sufficient power to power each of the powered communications port 158(1)-158(Q) at 30 Watts (i.e., a PoE Class 4 device).

Thus, to ensure proper operation of the maximum power consuming modules 152, 154, 160(1)-160(Z) possible in an RAU 14, less power could be provided to the powered communications port 158(1)-158(Q) or only one powered communications port 158(1)-158(Q) could be enabled with power. However, if one of the other modules 152, 154, 160(1)-160(Z) was not present, sufficient power may be available to be provided to each of the powered communications ports 158(1)-158(Q) provided. Further, if a PD 156 connected to a powered communication port 158 is a lower class device that does not require 30 Watts of power, there may be sufficient power available to power the PDs 156(1)-156(Q) connected to each of the powered communications ports 158(1)-158(Q).

Figure 7:
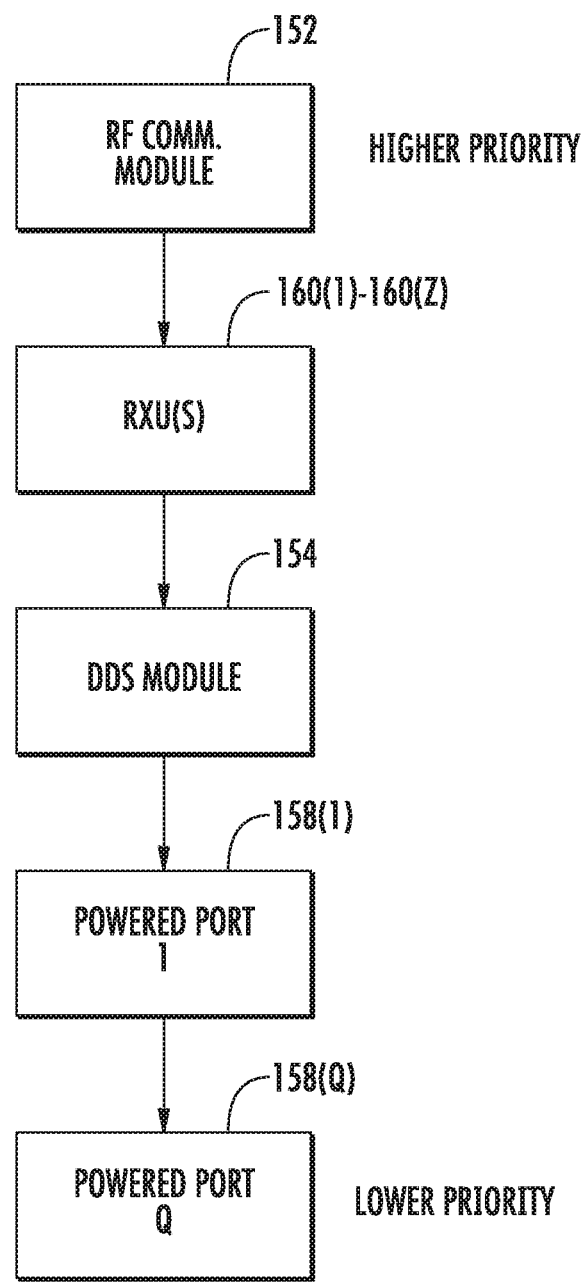
FIG. 7 is an exemplary priority scheme for providing power to power-consuming components that may be present in an RAU.

In this regard, FIG. 7 is an exemplary priority scheme for a power management scheme to provide sufficient power to power-consuming modules and PDs that may be powered by an RAU 14. In this example, RF communications services have been assigned higher priority than digital data services and powered ports. Thus, in this example, the available power on the power line 150 will be made available to the RF communications module 152. If more power is available from the power line 150 after power has been budgeted for the RF communications module 152, the remaining power is made available to the RXUs 160(1)-160(Z) to provide expansion RF communications services. If more power is available from the power line 150 after power has been budgeted for the RF communications module 152 and the RXUs 160(1)-160(Z), the remaining power is made available to the DDS module 154 to provide digital data services. If more power is available from the power line 150 after power has been budgeted for the RF communications module 152, the RXUs 160(1)-160(Z), and the DDS module 154, the remaining power is made available to the powered communications ports 158(1)-158(Q) to provide power to the PDs 156(1)-156(Q). Note that the priority schemed in FIG. 7 is exemplary and any other priority scheme desired could be implemented in a power management scheme.

With continuing reference to FIG. 7, power is budgeted such that power is made available sufficient to power the PD 158(1) connected to the first powered communications port 158(1). If more power is available from the power line 150 after power has been budgeted for the RF communications module 152, the RXUs 160(1)-160(Z), the DDS module 154, and the PD 158(1) connected to the first powered communications port 158(1), power is made available to the other powered communications ports 158(2)-158(Q) until sufficient power is not available to power the PDs 156(2)-156(Q) connected to the additional powered communications ports 158(2)-158(Q). If the remaining power budget is not sufficient to power the PDs 156 connected to any powered communications ports 158, these powered communications ports 158 can be disabled. Further, if any of the modules 152, 154, 160(1)-160(Z) are not present or are removed for a particular RAU 14, the available power budget for the powered communications ports 158(1)-158(Q) may increase thereby allowing previously disabled powered communications ports 158(1)-158(Q) to be enabled.

Figure 8:
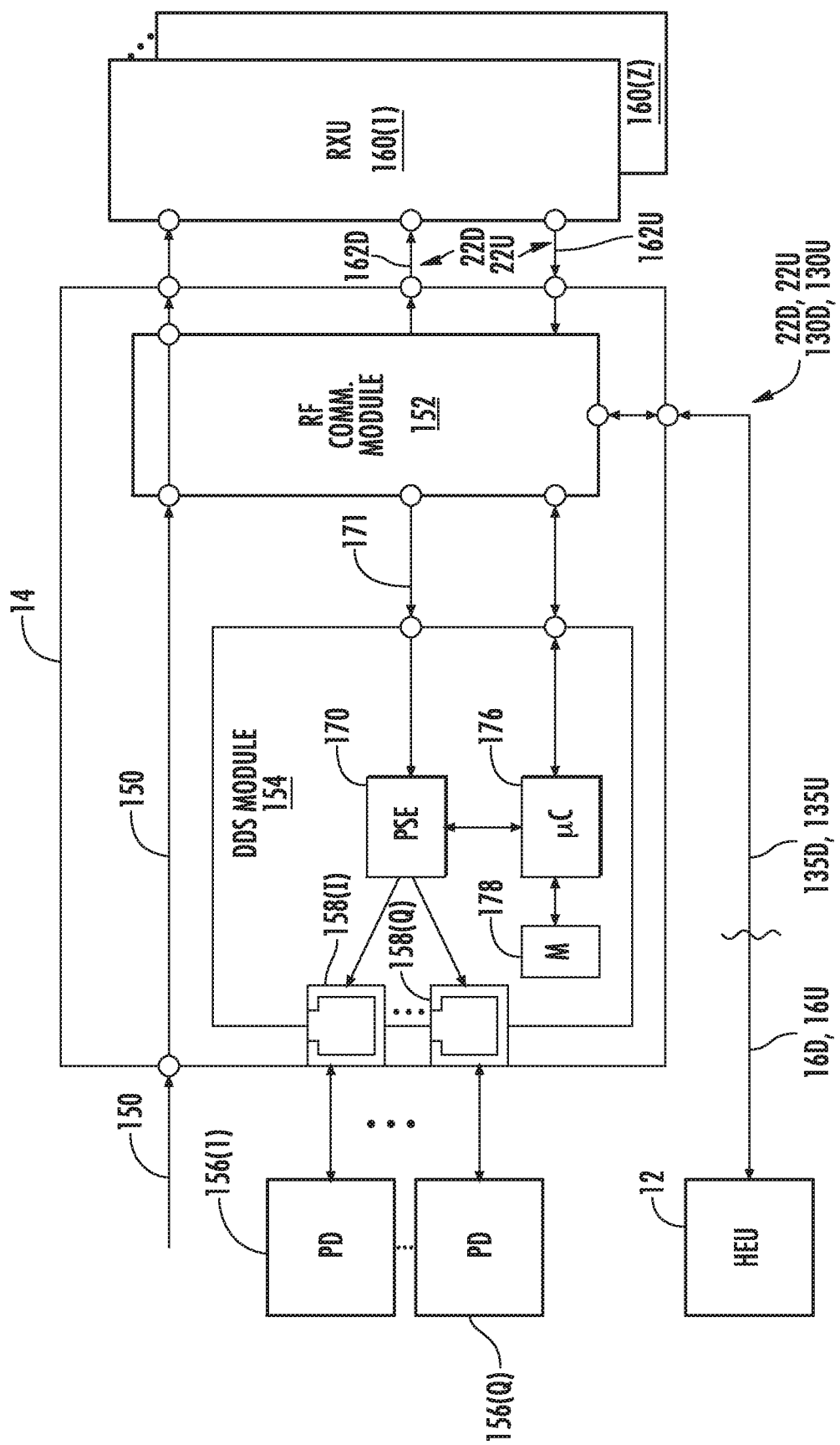
FIG. 8 is a schematic diagram of an exemplary RAU that includes remote power management for managing power provided to internal power-consuming modules and external power-consuming modules connected to the RAU.
Figure 9:
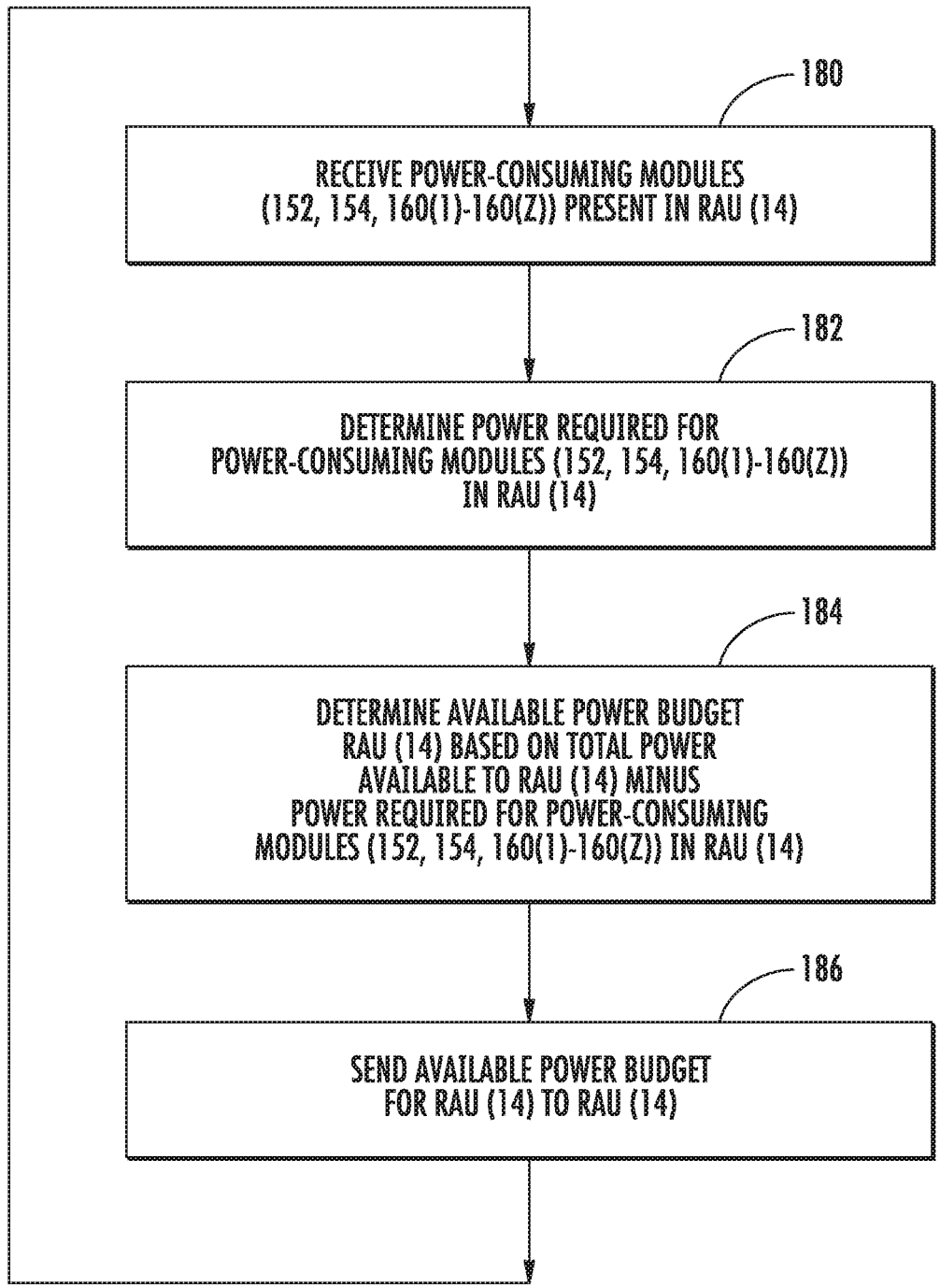
FIG. 9 is a flowchart illustrating an exemplary remote power management process provided by the controller in FIG. 8 to remotely manage power at the RAU.
Figure 10:
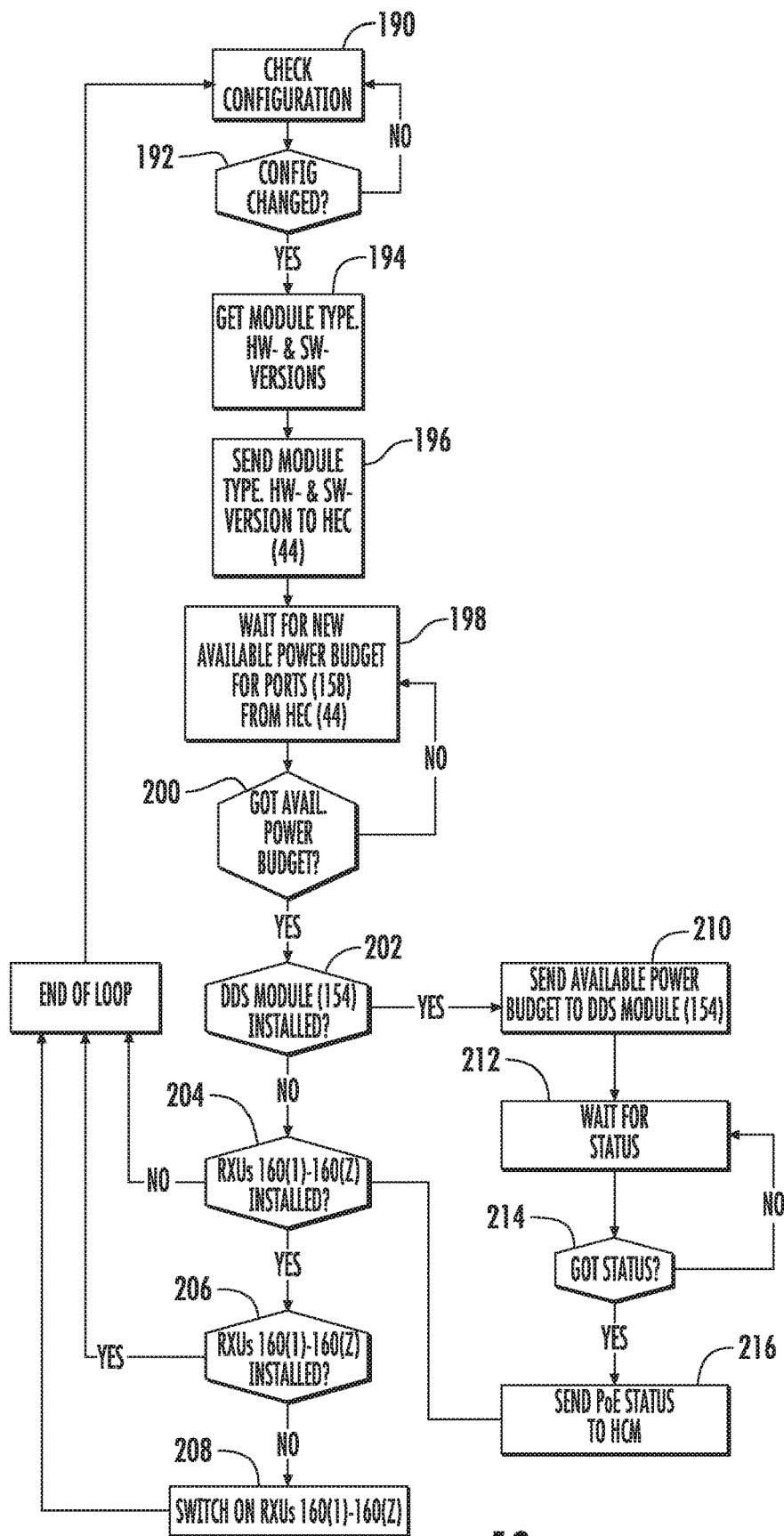
FIG. 10 is a flowchart illustrating an exemplary power management process provided by the RAU to manage power at the RAU at initialization and when configuration changes are made to the RAU.
Figure 11:
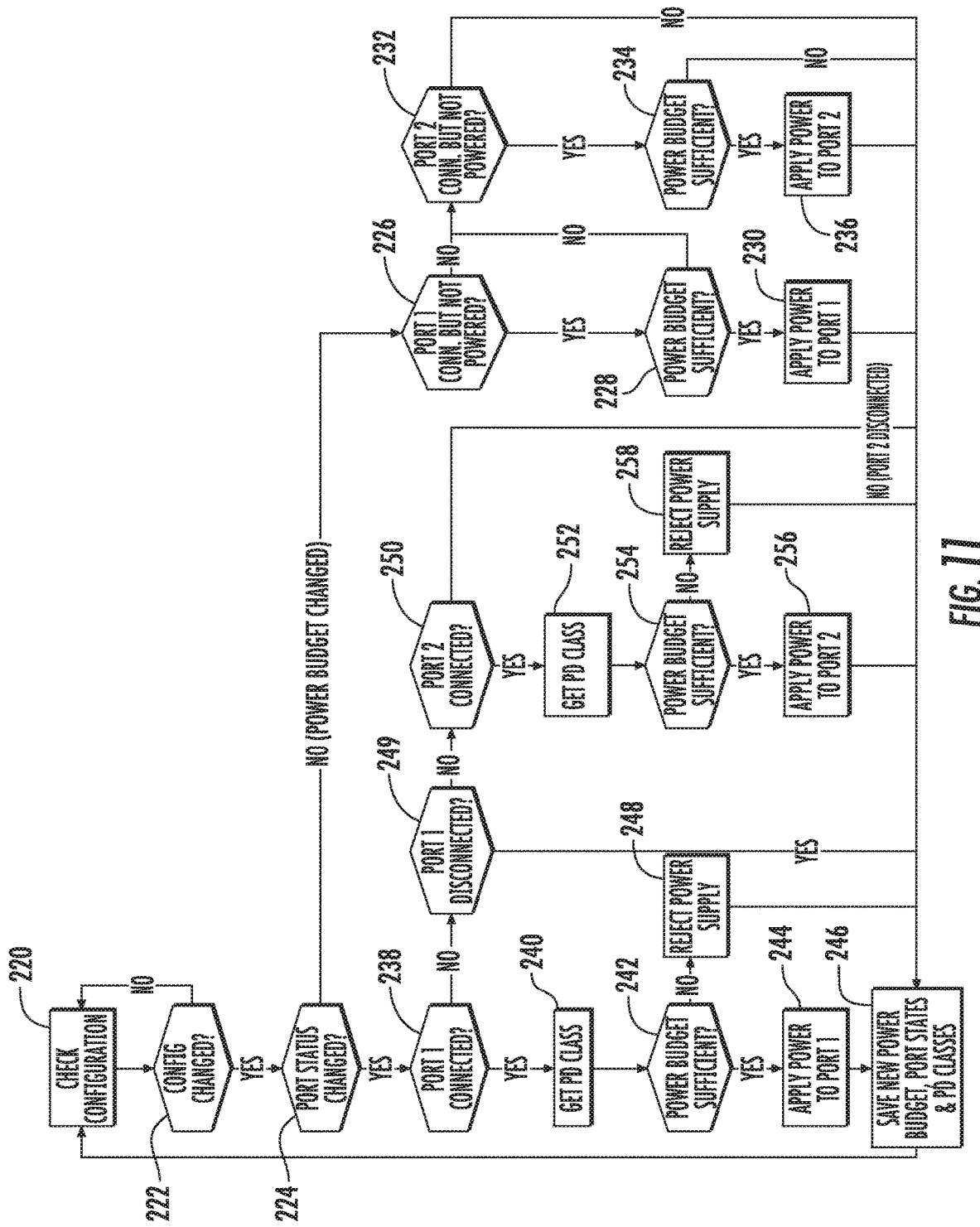
FIG. 11 is a flowchart illustrating an exemplary power management process provided by the RAU to manage power provided to powered ports provided in an RAU.

FIG. 8 is a schematic diagram of an exemplary embodiment of components that can be provided in the RAU 14 of FIG. 6 to provide for remote power management of power provided to the power-consuming modules 152, 154, 160(1)-160(Z) and the externally connected PDs 156(1)-156(Q). The discussion of remote power management of the RAU 14 in FIG. 8 will be described in conjunction with the flowcharts in FIGS. 9-11. FIG. 9 is a flowchart illustrating an exemplary remote power management process provided by the HEC 44 in FIG. 2 to perform remote power management at an RAU 14. FIG. 10 is a flowchart illustrating an exemplary power management process provided by an RAU 14 to manage power at the RAU 14 at initialization and when configuration changes are made to the RAU 14. FIG. 11 is a flowchart illustrating an exemplary power management process provided by an RAU 14 to manage power provided to PDs 156(1)-156(Q) connected to powered communications ports 158(1)-158(Q) provided in a RAU 14.

With reference to FIG. 8, the RAU 14 includes power source equipment (PSE) 170. The PSE 170 is configured to direct power from a power line 171, which receives power from the power line 150 through the RF communications module 152, to PDs 156(1)-156(Q) connected to the powered communications ports 158(1)-158(Q). A controller 176 provided in the DDS module 154 coupled to memory 178 is configured to provide power management functions according to an available power budget received from the HEC 44, as will be described in more detail below with regard to FIGS. 9-11. By receiving the available power budget that can be provided from the power line 150 by the PSE 170 to power the PDs 156(1)-156(Q) connected to the powered communications ports 158(1)-158(Q), the PSE 170 can manage directing power to the PDs 156(1)-156(Q) connected to the powered communications ports 158(1)-158(Q) without depriving the other modules 152, 154, 160(1)-160(Z) present in the RAU 14 from receiving sufficient power to operate.

As illustrated in FIG. 9, to provide power management at the RAUs 14, the HEC 44 in the HEU 12 is employed. For each RAU 14, the HEC 44 receives a configuration of which power-consuming modules 152, 154, 160(1)-160(Z) are present in the RAU 14 (block 180 in FIG. 9). The HEC 44 communicates with the RAUs 14 using digital communications communicated over the same communications links as provided to carry RF communications signals. More information on providing a digital communication and control system in a distributed antenna system is described in U.S. Provisional Application No. 61/230,472 filed on Jul. 31, 2009 entitled "Optical Fiber-Based Distributed Antenna Systems, Components, and Related Methods for Monitoring the Status Thereof," which is incorporated herein by reference in its entirety. The HEC 44 determines the power required for the modules 152, 154, 160(1)-160(Z) present in the RAU 14 by consulting the memory unit 46 (block 182 in FIG. 9). For example, the memory unit 46 may be programmed with the power consumption rates correlated to different types of modules 152, 154, 160(1)-160(Z) that can be looked up in the memory unit 46 by the HEC 44.

As will be discussed below with regard to FIG. 10, the RAU 14 may provide the particular hardware and/or software elements, and/or versions of those elements of the modules 152, 154, 160(1)-160(Z) present in the RAU 14 that can be used by the HEC 44 to determine the power requirements of the modules 152, 154, 160(1)-160(Z). The HEC 44 then determines the available power budget for the RAU 14 to provide power to any PDs 156(1)-156(Q) connected to the powered communications ports 158(1)-158(Q) based on the total power provided to the RAU 14 minus the power required to sufficiently power the modules 152, 154, 160(1)-160(Z) present in the RAU 14 (block 184 in FIG. 9). The total power available to the RAU 14 can be programmed into the memory unit 46, including by a user through a graphical user interface (GUI) hosted by the HEU 12, or by other configuration. The process continues on a repetitive basis for each of the RAUs 14 configured for the HEU 12. By performing the process in FIG. 9, the RAUs 14 receive the available power budget that can be allocated to provide power to the PDs 156(1)-156(Q) connected to the powered communications ports 158(1)-158(Q) in the RAUs 14.

The RAU 14 also performs a process to provide power management. The process may be performed by the controller 176 in the DDS module 154 illustrated in FIG. 8. FIG. 10 is a flowchart illustrating an exemplary power management process provided by an RAU 14 to manage power at the RAU 14 at initialization and when configuration changes are made to the RAU 14. The RAU 14 checks the configuration of the modules 152, 154, 160(1)-160(Z) present in the RAU 14 to determine if the configuration of the RAU 14 has changed (block 190). For example, a module 152, 154, 160(1)-160(Z) may have been added or removed from the RAU since the configuration was last determined and provided to the HEC 44. If the configuration of the RAU 14 has changed (block 192), the RAU 14 obtains the module type and the hardware and software versions of the modules 152, 154, 160(1)-160(Z) (block 194). The RAU 14 then sends the module type and the hardware and software versions of the modules 152, 154, 160(1)-160(Z) to the HEC 44 (block 196). This information is received by the HEC 44 in block 180 in FIG. 9, previously described above.

With continuing reference to FIG. 10, the controller 176 in the RAU 14 waits for the new available power budget for the RAU 14 provided by the HEC 44 according to the process in FIG. 9 (block 198). When received (block 200), the controller 174 determines if the DDS module 154 is installed in the RAU 14 (block 202). If not, the controller 176 determines if the RXU modules 160(1)-160(Z) are installed (block 204). If not, the process repeats. If the RXU modules 160(1)-160(Z) are installed (block 204), the controller 176 determines if the RXU modules 160(1)-160(Z) are switched on (block 206). If so, the process repeats. If not, the controller 176 instructs the RF communications module 152 to switch on the RXU modules 160(1)-160(Z) (block 208) and the process repeats.

With continuing reference to FIG. 10, if the controller 176 determines that the DDS module 154 is installed (block 202), this means that digital data services are provided by the RAU 14. In this instance, the powered communications ports 158 are present to allow PDs 156(1)-156(Q) to connect to the powered communications ports 158(1)-158(Q) to receive digital data services supported by the DDS module 154. In this regard, the controller 176 directs the PSE 170 to send the available power budget received from the HEC 44 to the powered communications ports 158(1)-158(Q) in the RAU 14 (block 210). The PDs 156(1)-156(Q) connected to the powered communications ports 158(1)-158(Q) may be enabled or disabled depending on the available power budget and the power requirements of the PDs 156(1)-156(Q) connected to the powered communications ports 158(1)-158(Q). The controller 176 waits for a status of the PDs 156(1)-156(Q) connected to the powered communications ports 158 (block 212). When the status of the PDs 156(1)-156(Q) connected to the powered communications ports 158(1)-158(Q) is received (block 214), the status is sent by the controller 176 to the HEC 44 (block 216). The controller 176 then powers on the RXU modules 160(1)-160(Z) if present and not already switched on (blocks 204, 206, 208).

FIG. 11 is a flowchart illustrating an exemplary power management process provided by an RAU 14 to manage power provided to PDs 156(1)-156(Q) when the status of the powered communications ports 158(1)-158(Q) provided in an RAU 14 changed (i.e., connected or disconnected). If the status of any powered communications port 158(1)-158(Q) has increased power requirements, such as by a new connection or a connection with a PD 156 requiring more power, other powered communications ports 158(1)-158(Q) may be required to be disabled to remain within the available power budget. If the status of any powered communications ports 158(1)-158(Q) has decreased power requirements, other powered communications ports 158(1)-158(Q) may be able to be enabled and still remain within the available power budget.

With reference to FIG. 11, the controller 176 determines if the configuration of the RAU 14 has changed (block 220). If changed (block 222), the controller 176 determines if the change is due to a change in status of a powered communications ports 158(1)-158(Q) in the RAU 14 (block 224). In this example, power is managed for two (2) powered communications ports 158(1), 158(2), but any number could be managed. If a powered communications port 158(1)-158(Q) has not changed, this means that the available power budget to provide power to the PDs 156(1)-156(Q) has changed since at least one module 152, 154, 160(1)-160(Z) has either been removed or added to the RAU 14. In this instance, the controller 176 determines if a PD 156(1) is connected to the first powered communications port 158(1) that is unpowered (block 226). If so, the controller 176 determines if the available power budget is sufficient to provide power to the PD 156(1) connected to the first powered communications port 158(1) (block 228). If so, the controller 176 directs the PSE 170 to provide power to the first powered communications port 158(1) (block 230). If not, the controller 176 checks the status of the second powered communications port 158(2) (block 232).

If the controller 176 determines that the first powered communications port 158(1) is not powered (block 226), the controller 176 determines if a PD 156(2) is connected to a second powered communications port 158(2) that is unpowered (block 232). If so, the controller 176 determines if the available power budget is sufficient to provide power to the PD 156(2) connected to the second powered communications port 158(2) (block 234). If so, the controller 176 directs the PSE 170 to provide power to the second powered communications port 158(2) (block 236). If not, the controller 176 does not change the power configuration of the second powered communications port 158(2). Thus, the controller 176 manages power to by enabling a first powered communications port 158(1) if available power budget is present, and then enabling a second powered communications port 158(2) if available power budget is available after providing power to the first powered communications port 158(1). When the available power budget changes for the RAU 14, the enabling or disabling of the powered communications ports 158(1), 158(2) is re-evaluated based on the available power budget.

If the status of the powered communications ports 158(1), 158(2) has changed (block 224), the current power settings of the powered communications ports 158(1), 158(2) is also re-evaluated. In this regard, if the first powered communications port 158(1) is connected (block 238), the controller 176 obtains the class of the PD 156(1) connected to the powered communications port 158(1) from the PSE 170 (block 240). The controller 176 determines if the available power budget is sufficient to power the PD 156(1) at its class rating (block 242). If so, the controller 176 directs the PSE 170 to enable the powered communications port 158(1) to provide power to the PD 156(1) connected to the powered communications port 158(1) (block 244). For example, if the available power budget is 16 Watts, a PoE Class 3 PD 156(1) rated at 15.4 Watts connected to a powered communications port 158(1) can be powered, and thus the powered communications port 158(1) is enabled. However, if a PoE Class 4 PD 156(1) rated at 30 Watts or less is connected to a powered communications port 158(1), the powered communications port 158(1) is disabled since the available power budget is less than 30 Watts.

The available power budget for the RAU 14 is updated by the controller 176 in memory 178 based on the class of the PD 156(1) connected to the powered communications port 158(1) (block 246) so that power is not directed to the second powered communications port 158(2) if there is not sufficient power budget remaining. If the available power budget is not sufficient to power the PD 156(1) connected to the powered communications port 158(1) (block 242), the controller 176 disables the powered communications port 158(1) so that power is not made available by the PSE 170 to the powered communications port 158(1) (block 248).

If a PD 156(1) is not connected to the first powered communications port 158(1) (block 238), the controller 176 determines if the first powered communications port 158(1) is disconnected (block 249). If not, the controller 176 determines if a PD 156(2) is connected to the second powered communications port 158(2) (block 250). If so, the controller 176 obtains the class of the PD 156(2) connected to the powered communications port 158(2) from the PSE 170 (block 252). The controller 176 determines if the available power budget is sufficient to power the PD 156(2) at its class rating (block 254). If so, the controller 176 directs the PSE 170 to enable the powered communications port 158(2) to provide power to the PD 156(2) connected to the powered communications port 158(2) (block 256). The available power budget for the RAU 14 is updated by the controller 176 in memory 178 based on the class of the PD 156(2) connected to the powered communications port 158(2) (block 246) to so that power is not directed to the other powered communications port 158(1) if there is not sufficient power budget remaining. If the available power budget is not sufficient to power the PD 156(2) connected to the powered communications port 158(2) (block 254), the controller 176 disables the powered communications port 158(2) so that power is not made available by the PSE 170 to the powered communications port 158(2) (block 258).

Figure 12:
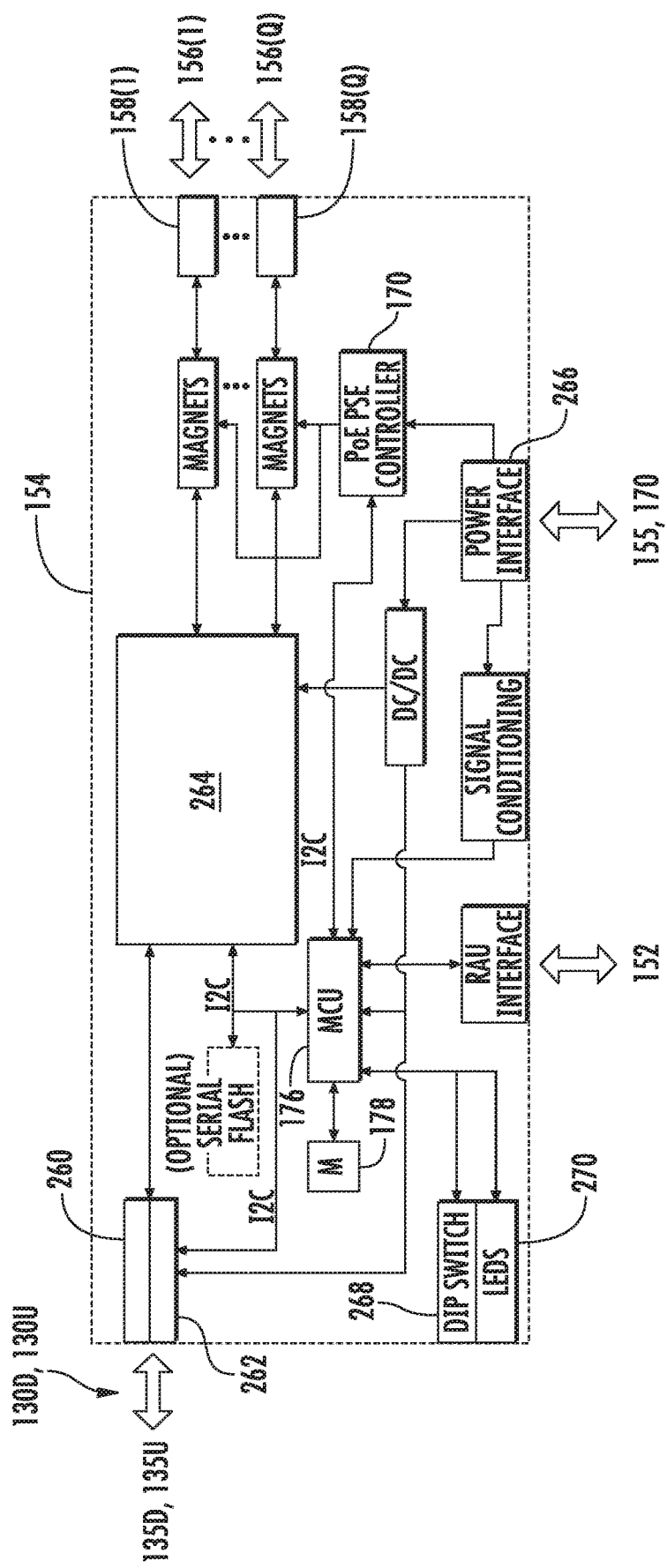
FIG. 12 is an exemplary digital data services (DDS) module that can be provided in the RAU to provide digital data services at the RAU.

FIG. 12 is a more detailed diagram of one embodiment of the DDS module 154 in FIG. 8 that can be provided in an RAU 14 to provide digital data services to the PDs 156(1)-156(Q) connected to the powered communications ports 158(1)-158(Q) and to provide power management for the powered communications ports 158(1)-158(Q), as described above. As illustrated in FIG. 12, the DDS module 174 includes a transmit optical sub-assembly (TOSA) 260 and a receive optical sub-assembly (ROSA) 262 to convert downlink optical digital signals 130D from the downlink optical fiber 135D to downlink electrical digital signals and convert uplink electrical digital signals to uplink optical digital signals 130U. A DDS switch 264 is provided to switch digital data services to the powered communications ports 158(1)-158(Q). The controller 176 is provided as a PoE PSE controller to manage power provided to the powered communications ports 158(1)-158(Q). A power interface 266 is provided to receive power from the power line 171 from the RF communications module 152. Switches 268 and light emitting diodes (LEDs) 270 are provided to allow configuration settings and to provide the status of the DDS module 174, respectively.

Figure 13:
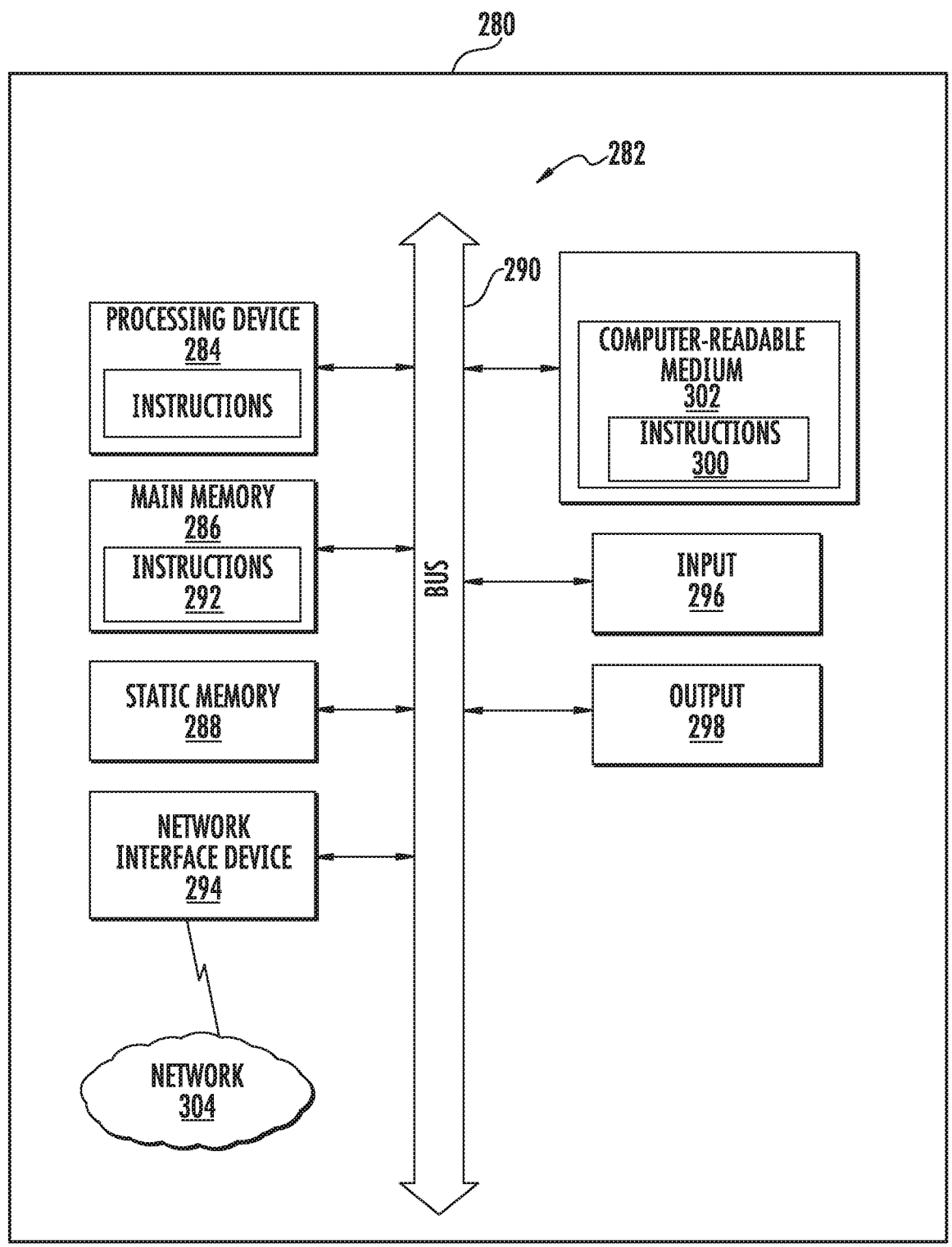
FIG. 13 is a schematic diagram of a generalized representation of an exemplary computer system that can be included in a head-end controller (HEC), which is adapted to execute instructions from an exemplary computer-readable medium to perform the power management functions in the RAU.

FIG. 13 is a schematic diagram representation of an exemplary electronic device 280 in the exemplary form of an exemplary computer system 282 adapted to execute instructions from an exemplary computer-readable medium to perform the power management functions. The electronic device 280 may be the DDS module 154, but could be any other module or device provided in the RAU 14. The electronic device 280 could be provided separately from the other modules 152, 154, 160(1)-160(Z) that can be configured for the RAU 14. In this regard, the electronic device 280 may comprise the computer system 282 within which a set of instructions for causing the electronic device 280 to perform any one or more of the methodologies discussed herein may be executed. The electronic device 280 may be connected (e.g., networked) to other machines in a LAN, an intranet, an extranet, or the Internet. The electronic device 280 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The electronic device 280 may be a server, a personal computer, a desktop computer, a laptop computer, a personal digital assistant (PDA), a computing pad, a mobile device, or any other device, and may represent, for example, a server or a user's computer.

The exemplary computer system 282 includes a processing device or processor 284, a main memory 286 (e.g., read-only memory (ROM), flash memory, dynamic random access memory (DRAM) such as synchronous DRAM (SDRAM), etc.), and a static memory 288 (e.g., flash memory, static random access memory (SRAM), etc.), which may communicate with each other via a bus 290. Alternatively, the processing device 284 may be connected to the main memory 286 and/or the static memory 288 directly or via some other connectivity means. The processing device 284 may be the controller 176, and the main memory 286 or static memory 288 may be the memory 178.

The processing device 284 represents one or more general-purpose processing devices such as a microprocessor, central processing unit, or the like. More particularly, the processing device 284 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 284 is configured to execute processing logic in instructions 292 for performing the operations and steps discussed herein.

The computer system 282 may further include a network interface device 294. The computer system 282 also may or may not include an input 296 to receive input and selections to be communicated to the processing device 284 when executing instructions. The computer system 282 also may or may not include an output 298, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 282 may or may not include a data storage device that includes instructions 300 stored in a computer-readable medium 302 embodying any one or more of the RAU 14 power management methodologies or functions described herein. The instructions 300 may also reside, completely or at least partially, within the main memory 286 and/or within the processing device 284 during execution thereof by the computer system 282, the main memory 286 and the processing device 284 also constituting computer-readable media. The instructions 300 may further be transmitted or received over a network 304 via the network interface device 294.

While the computer-readable medium 302 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processor and that cause the processor to perform any one or more of the methodologies of the embodiments disclosed herein. The term "computer-readable medium" shall accordingly be taken to include, but not be limited to, solid-state memories, optical and magnetic media, and carrier wave signals.

The DDS modules disclosed herein may be provided any type of digital data services. The powered communications ports provided in the RAU may be provided to meet any power standard. In the example of PoE, IEEE 802.3at specifies that link layer discovery protocol (LLDP) may be used and supported by the components described herein, including the controllers and power management components in the RAUs. LLDP allows exchange of data with PDs to determine the power rating of the PD. Also, more precise information regarding power requirements can only be exchanged using LLDP for media endpoint devices, such as LLDP-MED, according to TIA-1057). LLDP-MED allows requesting of power by PDs between 0 and 102.3 Watts in 0.1 Watt steps. LLDP and LLDP-MED are layer 2 protocols, which require a means to receive and transmit those Ethernet packets from and to PDs. This can be performed by the controllers disclosed herein and provided in the RAUs having an Ethernet media access controller connected to an Ethernet switch inside the media converter. Alternatively, power ratings for a PD could be provided manually or programmed into the RAUs by an operator accessing the RAUs in the distributed antenna system.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine-readable transmission medium (electrical, optical, acoustical or other form of propagated signals (e.g., carrier waves, infrared signals, digital signals, etc.), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structures in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings.

What is claimed is:

1. A remote unit for providing wireless services in a wireless communication system having a coverage area, comprising:
    at least one antenna configured to transmit radio frequency (RF) communications services to the coverage area;
    a transport optical sub-assembly configured to convert downlink optical digital signals to downlink electrical digital signals;
    a receive optical sub-assembly configured to convert uplink electrical digital signals to uplink optical digital signals;
    a first communications port coupled to the transport optical sub-assembly and coupled to the receive optical sub-assembly;
    a first external device connected to and powered through the first communications port, wherein the first external device is configured to provide digital data services (DDS) in the coverage area; and
    a second communications port configured to provide downlink optical RF communications to a second external device over at least one optical fiber.

2. The remote unit of claim 1, wherein the remote unit is configured to enable power for one or more of the first communications port and the second communications port based on an available power budget.

3. The remote unit of claim 2, wherein the second communications port is configured to receive uplink optical RF communications over the at least one optical fiber.

4. The remote unit of claim 1, wherein the remote unit is configured to disable power for one or more of the first communications port and the second communications port based on an available power budget.

5. The remote unit of claim 1, wherein:
    the second communications port is configured to receive uplink optical RF communications over the at least one optical fiber;
    the second communications port is an RJ-45 connector; and
    the digital data services include WiFi service.

6. A remote unit for providing wireless services in a wireless communication system having a coverage area, comprising:
    at least one antenna configured to transmit radio frequency (RF) communications services to the coverage area;
    a transport optical sub-assembly configured to convert downlink optical digital signals to downlink electrical digital signals;
    a receive optical sub-assembly configured to convert uplink electrical digital signals to uplink optical digital signals;
    an RJ-45 connector coupled to the transport optical sub-assembly and coupled to the receive optical sub-assembly;
    a first external device connected to and powered through the RJ-45 connector,
        wherein the first external device is configured to provide digital data services (DDS) in the coverage area; and
    a second communications port configured to:
        provide downlink optical RF communications to a second external device over at least one optical fiber; and
        receive uplink optical RF communications over the at least one optical fiber.

7. The remote unit of claim 6, wherein the remote unit is configured to enable power for one or more of the second communications port and the RJ-45 connector based on an available power budget, and wherein the digital data services include WiFi service.

8. The remote unit of claim 6, wherein the remote unit is configured to receive power at a voltage between forty-eight and sixty volts from a power line.

9. A remote unit for providing wireless services in a wireless communication system having a coverage area, comprising:
    at least one antenna configured to transmit radio frequency (RF) communications services to the coverage area;
    at least one electrical-to-optical (E/O) converter configured to convert electrical uplink communications to optical uplink communications;
    at least one optical-to-electrical (O/E) converter configured to convert optical downlink communications to electrical downlink communications;
    a first communications port configured to provide power and data connections;
    a first external device connected to and powered through the first communications port, wherein
        the first external device is configured to provide WiFi service in the coverage area; and
    a second communications port configured to provide downlink optical RF communications to a second external device over at least one optical fiber.

10. The remote unit of claim 9, wherein the remote unit is configured to enable power for one or more of the first communications port and the second communications port based on an available power budget.

11. The remote unit of claim 10, wherein the remote unit is configured to disable power for one or more of the first communications port and the second communications port based on the available power budget.

12. The remote unit of claim 9, wherein the second communications port is configured to receive uplink optical RF communications over the at least one optical fiber.

13. The remote unit of claim 12, wherein the first communications port is an RJ-45 connector.

14. The remote unit of claim 9, wherein the remote unit is configured to disable power for one or more of the first communications port and the second communications port based on an available power budget.

15. The remote unit of claim 14, wherein the second communications port is configured to receive uplink optical RF communications over the at least one optical fiber, and wherein the first communications port is an RJ-45 connector.

16. A remote unit for providing wireless services in a wireless communication system having a coverage area, comprising:
- at least one antenna configured to transmit radio frequency (RF) communications services to the coverage area;
- at least one electrical-to-optical (E/O) converter configured to convert electrical uplink communications to optical uplink communications;
- at least one optical-to-electrical (O/E) converter configured to convert optical downlink communications to electrical downlink communications;
- an RJ-45 connector configured to provide power and data connections;
- a first external device connected to the RJ-45 connector, wherein the first external device is configured to provide WiFi service in the coverage area; and
- a second communications port configured to:
  - provide downlink optical RF communications in at least one cellular communications band to a second external device over at least one optical fiber; and
  - receive uplink optical RF communications over the at least one optical fiber.

17. The remote unit of claim 16, wherein the remote unit is configured to enable power for one or more of the RJ-45 connector and the second communications port based on an available power budget.

18. The remote unit of claim 17, wherein the remote unit is configured to disable power for one or more of the RJ-45 connector and the second communications port based on the available power budget.

19. The remote unit of claim 16, wherein the remote unit is configured to receive power at a voltage of less than sixty volts from a power line.

* * * * *